United States Patent
Ho

(10) Patent No.: US 11,267,527 B2
(45) Date of Patent: Mar. 8, 2022

(54) SYSTEM FOR ROLLING A FOLDED BIKE

(71) Applicant: William Ho, Washougal, WA (US)

(72) Inventor: William Ho, Washougal, WA (US)

( * ) Notice: Subject to any disclaimer, the term of this patent is extended or adjusted under 35 U.S.C. 154(b) by 175 days.

(21) Appl. No.: 16/606,194

(22) PCT Filed: Apr. 23, 2018

(86) PCT No.: PCT/US2018/028922
§ 371 (c)(1),
(2) Date: Oct. 17, 2019

(87) PCT Pub. No.: WO2018/195547
PCT Pub. Date: Oct. 25, 2018

(65) Prior Publication Data
US 2020/0198721 A1    Jun. 25, 2020

Related U.S. Application Data

(60) Provisional application No. 62/514,821, filed on Jun. 3, 2017, provisional application No. 62/488,244, filed on Apr. 21, 2017.

(51) Int. Cl.
*B62K 15/00* (2006.01)
*B62J 7/04* (2006.01)
(Continued)

(52) U.S. Cl.
CPC ............ *B62K 15/008* (2013.01); *B62J 7/04* (2013.01); *B62K 3/04* (2013.01); *B60B 33/0026* (2013.01);
(Continued)

(58) Field of Classification Search
CPC . B62K 15/008; B62K 3/04; B62J 7/04; B60B 33/06
See application file for complete search history.

(56) References Cited

U.S. PATENT DOCUMENTS 7,341,270 B1 * 3/2008 Scholz ................ B62J 7/04
224/432
2010/0283228 A1 11/2010 Ehrenreich et al.
(Continued)

FOREIGN PATENT DOCUMENTS

CA          2628447 A1 * 10/2009 ............ B62K 15/00
CN      101870319 A * 10/2010 ........... B62K 15/008
(Continued)

*Primary Examiner* — Jacob D Knutson
*Assistant Examiner* — Myles A Harris
(74) *Attorney, Agent, or Firm* — Howard Russell

(57) ABSTRACT

Multi-mode auxiliary wheel system adapted for rolling a folded bike, comprising: an upper frame member, at least one supporting side frame member attached to the upper frame member and adapted for attachment to the foldable bike so that the upper frame member is positioned adjacent an upper portion of the rear wheel during an unfolded, ridable, condition of the bike, but adjacent a lower portion of the rear wheel and the ground during a folded, non-ridable, condition of the bike. Lateral and transverse attachment, detachment, and displacement, of the axle, whether horizontal pivotable displacement or not, are provided for with an axle member with auxiliary wheels thereon such that, together with a swivel caster auxiliary wheel, the system enables a user to wheel the bike when in a folded condition, in either a luggage cart type auxiliary wheeling mode or a shopping cart type wheeling mode.

20 Claims, 11 Drawing Sheets

(51) Int. Cl.
  *B62K 3/04* (2006.01)
  *B60B 33/00* (2006.01)
  *B60B 33/06* (2006.01)

(52) U.S. Cl.
  CPC ......... *B60B 33/06* (2013.01); *B62K 2015/005* (2013.01)

(56) References Cited

U.S. PATENT DOCUMENTS

| | | | | |
|---|---|---|---|---|
| 2012/0056399 | A1* | 3/2012 | Hon | B62K 15/008 280/278 |
| 2014/0291959 | A1 | 10/2014 | Yap | |
| 2014/0327226 | A1 | 11/2014 | Gerencser | |
| 2016/0144925 | A1* | 5/2016 | Wang | B62K 15/008 280/261 |
| 2019/0300099 | A1* | 10/2019 | Thomas | B62K 27/006 |

FOREIGN PATENT DOCUMENTS

| | | | | |
|---|---|---|---|---|
| CN | 105480355 | A * | 4/2016 | |
| CN | 106184557 | A * | 12/2016 | |
| CN | 106741446 | A * | 5/2017 | |
| CN | 108995754 | A * | 12/2018 | |
| CN | 109250023 | A * | 1/2019 | |
| CN | 109552520 | A * | 4/2019 | |
| CN | 111891280 | A * | 11/2020 | |
| CN | 111924035 | A * | 11/2020 | |
| DE | 102019004828 | A1 * | 1/2021 | |
| GB | 2468521 | A * | 9/2010 | ........... B62B 5/0003 |
| KR | 200324500 | Y1 * | 8/2003 | |
| KR | 20110024933 | A * | 3/2011 | |
| WO | WO-2014003629 | A1 * | 1/2014 | ............... B62H 1/12 |
| WO | WO-2014117126 | A1 * | 7/2014 | ............... B62K 15/008 |
| WO | 2015/026291 | A1 | 2/2015 | |
| WO | WO-2015026291 | A1 * | 2/2015 | ............... B62J 7/04 |

* cited by examiner

SYSTEM FOR ROLLING A FOLDED BIKE

CROSS-REFERENCE TO RELATED APPLICATION

This patent application claims the benefit and priority of U.S. Provisional Patent Application Ser. No. 62/488,244 filed 21 Apr. 2017 (the '244 Application); this patent application also claims the benefit of U.S. Provisional Patent Application Ser. No. 62/514,821 filed 3 Jun. 2017 (the '821 Application); the Applicant also has filed U.S. Provisional Patent Application Ser. No. 62/369,274 filed 1 Aug. 2016 (the '274 Application) with similar subject matter. The '244 Application referenced the '274 Application, and the '821 Application referenced both the '244 and the '274 Applications. Each of the foregoing applications, that is, the '244 Application, the '821 Application, and the '274 Application, are hereby incorporated by reference into this application.

FIELD

This invention relates generally to a system of auxiliary wheels for attachment to a bicycle, also known as a bike, having a foldable frame, for rolling the bike and its foldable frame while in a folded position, and more particularly to a system of auxiliary wheels, whether mounted on a separate rack, a separate auxiliary frame, or otherwise adapted for attachment to, or integration with, a foldable bike, and especially to a foldable bike of a certain type having a foldable frame which folds to a storage, or folded, position where a primary bike wheel (e.g., the rear bike wheel) and the primary wheel's supporting frame is pivoted about a folding portion of the bike so as to bring the primary bike wheel and its supporting frame to an upside-down orientation, but regardless of the type of foldable bike involved such that the auxiliary wheels are thereby brought to be located between the folded bike and the ground.

BACKGROUND

There have been provided of late various styles of foldable bikes which have facilitated travel by cyclist users, while also providing a relatively compact folded bike package able to be carried by the user while, for example, traveling on public transportation, while walking through a building, while shopping in a grocery store, or while walking up a flight of stairs, etc. And while these foldable bikes have greatly facilitated transportability of bikes generally, such folded bikes have nevertheless presented challenges to folded bike carrying transport by users, since the folded bikes of this type have still been heavy enough, on the order of 24 pounds or heavier, that they have not been easily carried longer distances, for example between terminals at an airport, or for longer periods of time, for example while grocery shopping, without a set of auxiliary wheels to facilitate transport during such distances and periods of travel. Such auxiliary wheels may have comprised smaller wheels rotating in, and about, one axis of rotation, as well as swivel caster, or omnidirectional, auxiliary wheels. In the present context, an omnidirectional wheel is considered in its generic meaning, namely a wheel, such as a swivel caster wheel, that is capable of wheeling in any direction in the plane of the surface on which the wheel is rolling. Thus, in this disclosure omnidirectional and swivel caster wheels are interchangeable.

In order to have assisted with the moving of a foldable bike, after it has been folded, there have been provided for facilitating transport of the folded bike, various different prior art auxiliary wheel, or auxiliary wheels, systems. Such auxiliary wheel, or wheels, systems have sometimes been comprised of a frame member having one or more auxiliary wheels, that is wheels which are substantially smaller than the bike's primary wheels and which have been mounted on the frame member for supporting a folded bike during auxiliary transport. Or alternatively, sometimes such auxiliary wheels have been mounted directly on the frame or a fender of the foldable bike. Such auxiliary wheel systems have been designed either for use alone, or in conjunction with the bike's primary wheels, for facilitating transport of the folded bike.

There are two primary modes of auxiliary transportation facilitated by auxiliary wheel systems of foldable bikes, a rolling luggage cart type mode, and a rolling shopping cart type mode. In the rolling luggage cart type mode of auxiliary transport, or wheeling of a folded bike, a user typically has grabbed a highermost, or extended, portion of the folded bike, such as the bike seat, a handle bar, or even a portion of the frame depending on the manner of folding of the bike, and has tipped the folded bike onto typically non-swiveling (i.e., fixed in one axis of rotation, but nevertheless rotatable) wheels so that the user has been enabled in auxiliary wheeling of the folded bike much like a user of a large suitcase might do on wheels mounted on the bottom of the suitcase.

In the rolling shopping cart type mode of auxiliary transport, or wheeling, of a folded bike, though the user has often still grabbed the higher most, or extended, portion of the bike (as with the aforementioned type of transport), the user in this case has not tipped the bike onto non-swiveling wheels, but rather the folded bike has been free to rest upright on the auxiliary wheel system of the prior art, which in turn has allowed the user to move the bike around on a flat surface, such as the surface of a grocery store or other shopping mall. In the case of the shopping cart type of transport, there also have been provided attachments by bike manufacturers, for example near the handle bar portions of the folded bike, for holding an open bag adapted for the placement of grocery or other purchased items in the bag, to be wheeled about in the shopping cart mode on the auxiliary wheel framework of these prior art systems. However, such designs have been to varying degrees compromised in terms of aesthetics, and more importantly stability, so as to not have been as useful as they might have otherwise been as a shopping cart type mode device.

In both of the aforementioned types, or modes, of auxiliary transportation, stability against unintended tipping and falling of the folded bike and easier steering are needed, especially when there is provided a shopping bag or container attached to the bike frame for carrying groceries. It is also a commonly understood experience the waddling, or side-to-side tipping, of attempting to quickly maneuver an object during a luggage cart type mode of transport on too narrow of an axle, or wheelbase. Further, one can appreciate the need for improvement of stability against tipping caused by an insufficiently stable auxiliary wheel transport system. Therefore, there have been provided auxiliary wheel transport systems having longer axles to improve stability, but in the past some of these longer-axle auxiliary wheel transport systems have impeded easy turning of the crank of the bike with a user's foot. And so responsive to this problem there has been provided in the prior art an extendable-axle to increase the stability of the auxiliary wheel transport system during folded bike auxiliary transport (i.e., with an extended position of an extendable axle), while also providing maximum mobility for the user during turning the bike's crank with one's legs and feet during unfolded bike riding (i.e., with a retracted auxiliary transport mode axle).

Among the foregoing types of auxiliary wheel systems, generally there have been provided systems of the following different class types (together with some of their shortcomings), where the folded bike has been:
1) rolled about in a folded condition of the bike exclusively on the bike's own primary wheels. Such a system has had several disadvantages as compared to an auxiliary wheel system;
2) rolled about on a combination of a primary wheel (or wheels) of the bike together with a set of fixed (i.e., not swiveling caster wheels)—See U.S. Pat. No. 9,776,682 to Gerencser;
3) rolled about on a combination of the primary wheels of the bike together with a swiveling caster wheel, that is, to allow both shopping cart and luggage cart type modes of transport—See U.S. Pat. No. 4,433,85 to Hon, and U.S. Pat. No. 7,175,192 to Lu—Bicycles that have been of a type 1), 2), and 3) above have shared the disadvantages that they have only been able to be wheeled in a forward direction (or else the primary wheel would turn the pedals causing them to hit the bicycle frame during auxiliary rolling.) Furthermore, steering of the folded bicycle during auxiliary rolling has been less than ideal with these types of systems because they have lacked a swivel caster wheel in some designs, or if there has been a swivel caster, it has been positioned off the center line of the travel lane because the swivel caster wheel has been mounted on or near the bicycle center line which has been off the centerline of the travel lane when the bicycle's front half has been folded to the left or to the right of the bicycle's rear half;
4) rolled about on non-swiveling rollers mounted on racks for sideways, more stable, luggage cart type mode rolling only—See U.S. Pat. No. 7,341,270 to Scholz, and U.S. Pat. No. 8,205,902 to Uimonen et al. Disadvantages of this type of system is that it presents a more cumbersome structure, and it is harder to maneuver in a tight space during auxiliary rolling; and
5) rolled about on a rolling platform with more than two non-swiveling rollers (e.g., often four rollers—See U.S. Pat. No. 7,591,473 to Tak-Wei Hon et al.; see also, Brompton Bicycle Limited, Mezzo Folding Bikes Limited, and Birdy Folding Bikes. This design has had the disadvantages that it has not been as stable during auxiliary rolling because of a narrower wheelbase on the order of only about five inches, and there has been no steering during auxiliary rolling. Thus, the user has had to raise the wheels off the ground or has had to drag the wheels to set a new direction. In one such commercially-available prior art embodiment by Birdy Rear Racks the front two such non-swiveling rollers have been minimally able to be turned with a steering linkage in an effort to address these limitations. To help overcome these limitations, there have been provided commercially available X-rollers which have aided stability some when rolling the folded bike, but this has not helped a lack of steering associated with this design.

As described further below, the shortcomings of each of these types of auxiliary wheel systems may be improved upon as taught by the present disclosure and invention.

Prior art auxiliary wheel systems for foldable bikes have been mounted on a rear rack of the foldable bike, or on the frame or a fender of the bike itself. The latter types of designs have been generally somewhat difficult to maneuver and have been subject to failure since the fender of a bike has not otherwise required such hefty construction as has an auxiliary wheeling system. Thus, such prior art systems have naturally been somewhat cumbersome, have been difficult to steer or having possessed no steering capability, have been unstable (especially at higher rolling speeds), have been subject to mechanical failure, have unduly increased the package size of the folded bike, and in some cases have been complicated to operate and implement. Thus, to varying degrees, such prior art systems have been less than ideally effective for repeated use, for being pushed or drawn over longer distances, or for having supported greater weight shopping contents in a bag mounted on the bike. And while some prior art designs have allowed for a luggage cart type transport, and others have allowed for a shopping cart type transport, there has not been known a single prior art device that has provided both types of transport in one design that is both more stable and easy to use in multiple different auxiliary transport modes.

Again, certain folding bike designs (namely sideways rolling designs) have successfully allowed a user to transport a folded bike from one point to the next in a tipped position of the folded bike, the bike having been held in a tipped position on preferably an axle with two directionally-fixed wheels by the user who has transported the same on fixed-axis wheels, just as a traveler has done with a large suitcase. This is because a longer wheel base has been permitted longitudinally along the line or axis of the travel of the bike without impairing pedaling motion. Alternatively, other systems have (less successfully in terms of stability) allowed a user to transport folded bikes while using the folded bike as a shopping cart in an upright, non-tipped, position of the bike. Thus, these two modes of transporting folded bikes have allowed the user to ride the bike to a destination, such as a commuter train, to have folded the bike into an auxiliary transport mode as has been known, to have wheeled it about with the bike optionally tipped on two wheels of an auxiliary wheel frame work for transport in a luggage cart type mode, or alternatively in another type of design to a destination such as a grocery store, to have folded the bike into an auxiliary transport mode as has been known, and to have somewhat successfully have wheeled it around with the bike resting on a rolling auxiliary wheel framework in a shopping cart type mode.

And while some bikes have allowed both modes of transport, shopping cart mode and luggage cart mode in a single design, their axle systems have been too short (or narrow), on the order of five inches wide, or less, causing them to have been prone to tipping when a heavier, or top-heavy, shopping cart type load has been applied. And this has been in part because with such designs there have been generally competing objectives at play, one of a compact folded transverse design, and another of a transversely-oriented-axle (where the axle has been fixed, that is mounted, oriented transversely, or perpendicular, relative to the direction of travel of the wheels of the bike). Further, too long of an axle in this type of design has unduly impeded pedaling of the bike, whereas too short of an axle in such a design (as has been common in the past) has led to undue instability, or wobbling upon maneuvering, whether in shopping cart mode or luggage cart mode. For this reason, there have been developed extendable axles for such designs. Further, as described above, these two modes of transport have been enabled in the prior art, both with auxiliary wheeling taking place either independently of the primary wheels of the bike, or together with the primary wheels of the bike, whether for a shopping cart type of transport, and/or for a luggage suitcase type of transport.

Some types of auxiliary transport described above have been more prone to a tipping over type of instability than others. Of course, when the primary wheels of the folded bike have been used to transport the bike in a luggage cart type auxiliary transport mode, or in a shopping cart type auxiliary transport mode, the competing objective of a trim, narrow, folded bike design has conflicted with another objective of providing an axle that would have had a sufficiently wide wheelbase for stability. In the past these competing objectives have led to too narrow of an axle for a fixed wheelbase to have provided a more stable auxiliary transport requiring a broader wheelbase. Or, since an auxiliary transport system that has employed a longer axle wheelbase for luggage cart type auxiliary transport mode has impeded pedaling by users, there have been developed extendable axle wheelbases—but such extendable wheelbase systems may have been more prone to malfunction over time.

Thus, while some improvements to stability have been provided for auxiliary transport of prior art foldable bikes, during auxiliary transport of the bikes in their folded condition, for example by utilizing the larger primary wheels of the bike to facilitate auxiliary transport of the bike, both in luggage cart transport mode or shopping cart transport mode, some stability problems have still persisted. And while some improvements to stability have also been provided by extending an axle, or by making extendable an axle, for luggage cart transport and shopping cart transport types of auxiliary wheeling systems, there have nevertheless persisted instability and inherent structural weakness in both types of transport modes, whether luggage cart type mode or shopping cart mode, since simple designs for such have not been heretofore developed which have not unduly impeded the rideability of the bike. Thus, and perhaps more importantly, prior art systems have not facilitated both a more stable luggage cart mode of auxiliary transport, and a more stable shopping cart mode of auxiliary transport, all in a single, easy-to-use, and stable, system which has not unduly impeded the rider in riding the bike.

One particular style of bike, for which one or more of the foregoing types of prior art auxiliary wheel systems has been developed, comprises that type of foldable bike having a foldable frame which has folded to a storage, or folded, position where a rear primary bike wheel and the rear wheel's supporting frame has been pivoted, about a more forward pivot point for the front part of the bike, and also about a lower rear pivot point so as to bring the rear primary bike wheel and its supporting frame, together with a fender, if any, to an upside-down orientation relative to the ridable, normal, orientation of the unfolded bike. Examples of this type of folding bike frame include popular brands such as those provided by Brompton, Birdy, Bike Friday (BF), and Mezzo, foldable bikes.

In such a folded position, auxiliary transport wheel systems for this type of bike (inverted wheel upon folding) have been located in one of a plurality of possible positions between the folded bike, including its primary wheels, and the ground. Thus stored, the bike has been, to varying degrees of stability as further described herein, able to have been wheeled about by a user on the auxiliary wheels alone, or together with the bike's primary wheels as described above. Also, as described above, this type of foldable bike has also provided two basic transport modes, in a luggage cart mode where the folded bike frame has been tipped by the user for wheeling onto two fixed-direction type (not swiveling) auxiliary wheels. Or, auxiliary transport of the bike may have been accomplished in a shopping cart mode, where the folded bike frame has sat upright on a plurality of auxiliary wheels alone, wherein one or more of the wheels have been provided as caster-type dolly, or otherwise ominidirectional, wheels.

Unfortunately, auxiliary transport with such designs has been less maneuverable in tight space in case of wheeling in luggage cart mode or less stable than desired in shopping cart mode.

Thus, while there have been devised independent solutions to a need for both modes of transport for foldable bikes of the inverted rear wheel type of design (for example by employing an extendable transverse axle otherwise prone to weakness and failure because of the extendable axle design), there has been lacking in the prior art, until the present invention, a multi-modal, more stable, more effective and easier-to-implement auxiliary wheel system for transporting foldable bikes comprising a single, reliable, and sturdy device.

SUMMARY

In accordance with a first aspect and embodiment of the invention, there is provided a multi-mode auxiliary wheel system, adapted for attachment to a bike having a foldable frame and having lateral wheel supporting struts supporting a rear wheel on the foldable frame, for bike riding on the foldable frame. This system is adapted for enabling a user in auxiliary rolling of the bike in a folded bike condition, and the system comprises: at least one lateral frame member, at least one transverse frame member adapted for attachment to the foldable frame of the bike, and at least one supporting side frame member interconnecting the at least one lateral frame member and the at least one transverse frame member. The at least one supporting side frame member is also adapted for attachment to a wheel supporting strut of the foldable frame so that the lateral frame member and the transverse frame member are positioned adjacent the rear wheel in an unfolded, ridable, orientation of the bike.

The multi-mode auxiliary wheel system further comprises a detachable, or otherwise repositionable or transpositionable, elongated axle member adapted for attachment to, and easy detachment from, each said at least one lateral frame member and said at least one transverse frame member. Furthermore, there are provided a plurality of auxiliary wheels rotatably mounted on the detachable elongated axle member, and at least one swivel caster, or omnidirectional, auxiliary wheel attached to the at least one lateral frame member. In the present context, an omnidirectional wheel is considered in its generic meaning, namely a wheel, such as a swivel caster wheel, that is capable of wheeling in any direction in the plane of the surface on which the wheel is rolling. Thus, in this disclosure omnidirectional and swivel caster wheels are interchangeable.

In a first position of attachment of the detachable elongated axle member on the at least one lateral frame member, the multi-mode auxiliary wheel system is adapted for enabling luggage cart type auxiliary rolling of the folded bike during which the at least one swivel caster auxiliary wheel need not touch the ground upon a user's tipping of the folded bike for auxiliary rolling on the plurality of auxiliary wheels rotatably mounted on the detachable elongated axle member.

And in a second position of attachment of the detachable elongated axle member on the at least one transverse frame member, the multi-mode auxiliary wheel system is adapted for shopping cart type rolling of the folded bike during which each of the plurality of rotatable auxiliary wheels mounted on the detachable elongated axle member and the at least one swivel caster auxiliary wheel are all enabled to touch the ground.

To provide for stability during auxiliary wheeling of the folded bike, the invention comprises an axle which is at least longer than the bike is wide in an unfolded condition of the bike. Thus, in accordance with an aspect of the invention, there are a range of axle lengths which may accomplish the object of stability ranging from a minimal length on the order of about 5 inches, to a longer length on the order of approximately 30 inches. However, it will be appreciated that the invention as claimed is not subject to any particular length of axle, as different bikes will have different characteristics, weight, center of gravity, unfolded width, folded width, etc., such that the length of axle suitable in any given situation is dependent upon, and relative to, these other considerations. Thus, in accordance with an aspect of the invention, the axle is repositionable, or transpositionable, whether through substantially horizontal pivoting of the axle between fixable transverse and lateral positions, ball and socket pivoting, detachment and reattachment on the system framework in such positions, or other equivalent method of repositioning of the axle of the multi-mode auxiliary system. These terms, repositionable and transpositionable, whether through detachment and reattachment, horizontal pivoting, or a combination of these, are interchangeable terms in the present application.

During shopping cart mode of operation of the invention, wherein the axle may preferably be in a transverse position, but not excluding such in a lateral position or other partial position between these two, preferably the auxiliary wheels on the axle and the omnidirectional wheel form an isosceles triangle base configuration, with the omnidirectional wheel located on a bisecting line of the triangle, the bisecting centerline also lying superimposed on the centerline of travel of the system in shopping cart mode. Thus, the invention permits an appropriate length may be achieved as the base of the isosceles configuration, as well as an appropriate height of the isosceles configuration (as determined by the distance of an omnidirectional wheel from the axle), to achieve stability, through the inventive concept of a repositionable axle for three modes of use, riding or slipstream mode wherein the bike is not folded, but is ridable, luggage cart mode wherein the bike is folded and tipped for wheeling by a user, and shopping cart mode wherein the bike is folded and rests, and is wheelable, on at least three auxiliary wheels. This object and design of the invention is characteristic of each embodiment of the invention described herein.

In the aforementioned multi-mode auxiliary wheel system of this embodiment and aspect of the invention, the at least one lateral frame member may comprise a plurality of lateral frame members, at least one of the plurality of lateral frame members being adapted for positioning preferably adjacent an upper portion of each side of the rear wheel of the bike. Further, in this embodiment and aspect of the invention, the at least one transverse frame members may comprise a plurality of transverse frame members, and the at least one supporting side frame member may comprise a plurality of supporting side frame members. With this aspect and embodiment of the invention, each of the supporting side frame members may interconnect a lateral frame member to a transverse frame member, and each supporting side frame member may attach a lateral frame member and a transverse frame member to a wheel supporting strut of the foldable frame. In this way, the lateral frame members and the transverse frame members are positioned adjacent an upper portion of the rear wheel in an unfolded, ridable, orientation of the bike.

Further in accordance with this embodiment and aspect of the invention, the plurality of lateral frame members may be substantially horizontal, and at least one of the plurality of transverse frame members may be substantially horizontal, while another of the plurality of transverse frame members may comprise an inverted U-shaped frame member. Also, each of the plurality of supporting side frame members may form an angular V-shaped frame member, each angular V-shaped frame member being interconnected by the transverse frame members adjacent an uppermost portion of each V-shaped frame member so as to interconnect the plurality of V-shaped frame members. Also, each of the plurality of lateral frame members may span and interconnect each uppermost angular portion of each V-shaped member, so as to create a generally triangular and wedge-shaped overall frame structure for the multi-mode auxiliary wheel system. In such an embodiment, a lowermost portion of each V-shaped frame member is adapted for interconnection of the overall frame structure with the foldable frame at a point where the wheel supporting struts of the foldable frame attach to, or adjacent, a rear axle for the rear wheel.

In this embodiment and aspect of the invention, the multi-mode auxiliary wheel system may further comprise an extension frame member extending from one of the plurality of lateral frame members so as to be adapted for retaining an axle portion of the at least one omnidirectional (e.g., a swiveling caster wheel) wheel. The extension frame member may be located at a position remote from the attachment area on the at least one lateral frame member (e.g., on another lateral frame member adapted for positioning on the other side of the rear wheel of the bike), and remote from the attachment area on at least one of the plurality of transverse members (e.g., on another lateral frame member adapted for positioning near, or behind, a rear portion of the rear wheel of the bike), so as to create a stable auxiliary wheel rolling base for shopping cart type auxiliary rolling of the folded bike.

In accordance with another aspect of the invention, an embodiment of the multi-mode auxiliary wheel system may further comprise an offset attachment bracket on the detachable elongated axle member, the offset attachment bracket being positioned more closely adjacent one rotatable axle wheel on the detachable elongated axle member than to another rotatable axle wheel. Thus, upon attachment of the detachable elongated axle member on the substantially horizontal one of the plurality of transverse frame members in this manner, the rotatable wheels and the at least one omnidirectional, or caster, wheel are configured in the form of an isosceles triangle with the center of rotation of the at least one caster wheel being positioned on a bisecting centerline of the triangle (the bisecting centerline also lying superimposed on the centerline of travel of the system in shopping cart mode) for improved stability during shopping cart type rolling. In accordance with this aspect of the invention, there may be provided an additional notch, or notches, on the frame members for accommodating the elongated portion of the axle that is away from the offset attachment bracket to better accommodate heavier bike or carrying capacity loads.

Alternatively, in accordance with another embodiment of the multi-mode auxiliary wheel system, in accordance with this aspect of the invention, greater stability in the shopping cart mode may be accomplished alternatively, or enhanced alternatively, by placing the wheel base in the form of a larger isosceles triangle by providing that the detachable elongated axle member may be extendable such that the rotatable auxiliary wheels on the detachable auxiliary axle member are further apart during an extended orientation and adapted for greater stability for auxiliary wheeling of the bike in a folded orientation. In this way, the competing design constraint of a desired more narrowly folded package may be overcome by providing for extending of the detachable elongated axle member in this way.

Preferably, in accordance with yet another aspect of the invention, the multi-mode auxiliary wheel system may further comprise a plurality of attachment receptacles, at least one attachment receptacle for the at least one lateral frame member and at least one attachment receptacle for the at least one transverse frame member. Accordingly, this aspect of the invention may further comprise quick-release quarter-turn fastening hardware, or other quick-release type fastening members, such as clips or straps, wherein the plurality of attachment receptacles are adapted for receipt and release of the fastening hardware for easy and quick attachment of, and quick detachment of, the detachable elongated axle member to and from the plurality of attachment receptacles. In other embodiments, the attachment receptacles may comprise clips on the frame or axle, slidable pin and slot combinations on the axle and frame, rectangular or circular receptacle and pin combinations as set forth in one or more embodiments and in provisional patent applications by the applicant and referenced herein.

In accordance with yet another aspect and embodiment of the invention, there is provided a multi-mode auxiliary wheel system adapted for rolling a folded bike of a type having a rear wheel and wheel supporting struts, the rear wheel and supporting struts combination being foldable about a bike frame articulation joint to a folded position where the rear wheel and supporting struts are positioned upside down while in a folded non-ridable configuration of the bike. The multi-mode auxiliary wheel system in accordance with this aspect of the invention comprises: an upper auxiliary wheel system rack frame member, and at least one supporting side frame member attached to the upper auxiliary wheel system rack frame member and adapted for attachment to the wheel supporting struts of the foldable bike so that the upper auxiliary wheel system rack frame member is positioned adjacent an upper portion of the rear wheel in an unfolded, ridable, orientation of the bike. In accordance with this aspect of the invention, there may be provided a first attachment receptacle on the upper auxiliary wheel system rack frame member, a second attachment receptacle on the upper auxiliary wheel system rack frame member, and a detachable elongated axle member adapted for attachment to the first attachment receptacle and alternatively to the second attachment receptacle on the upper auxiliary wheel system rack frame member.

Further, in accordance with this aspect and embodiment of the invention, there are provided a plurality of auxiliary wheels rotatably mounted on the detachable elongated axle member, and at least one swivel caster, or omnidirectional, auxiliary wheel attached to the upper auxiliary wheel system frame member. In a first position of attachment of the detachable elongated axle member on the upper auxiliary wheel system rack frame member the multi-mode auxiliary wheel system is adapted for enabling luggage cart type auxiliary rolling of the folded bike during which the at least one swivel caster auxiliary wheel need not touch the ground upon a user's tipping of the folded bike for auxiliary rolling on the plurality of auxiliary wheels rotatably mounted on the detachable elongated axle member.

In a second position of attachment of the detachable elongated axle member on the upper auxiliary wheel system frame member the multi-mode auxiliary wheel system is adapted for shopping cart type rolling of the folded bike. During this operation, each of the plurality of rotatable auxiliary wheels mounted on the detachable elongated axle member, and the at least one swivel caster auxiliary wheel, are all enabled to touch the ground. The embodiment of this aspect of the invention provides that the upper auxiliary wheel system rack frame member is adapted for attachment to the bike such that during a ridable non-folded condition of the bike the upper auxiliary wheel system rack frame member serves an additional purpose of providing a flat surface, or rack, for a user to support and secure books, groceries, and the like while riding the bike.

The multi-mode auxiliary wheel system upper rack of this aspect and embodiment of the invention may be substantially or generally rectangular frame member, and it is adapted to be supported on the wheel supporting struts for the rear wheel of a foldable bike of the type where, upon folding of the frame, the rear wheel, and its associated support struts on the bike, are stored upside down, such that in the folded condition of the bike the rack would be positioned between the rear wheel of the bike and the ground. While this is one embodiment of the invention, it will be appreciated that the invention may be applied to any foldable bike, not just a bike of the type mentioned in this aspect of the invention, as long as there is provided a repositionable axle adapted for inclusion with a omnidirectional wheel in an isosceles triangle-shaped base configuration.

In accordance with another aspect of the invention, there is provided an offset attachment bracket on the detachable elongated axle member, the offset attachment bracket positioned more closely adjacent one rotatable axle wheel than another wheel on the detachable elongated axle member such that upon attachment of the detachable elongated axle member in a second position of attachment, the rotatable wheels and the at least one caster wheel are configured in the form of an isosceles triangle with the center of rotation of the at least one caster wheel being positioned on a bisecting centerline of the triangle for improved stability during shopping cart type rolling. In accordance with this aspect of the invention, there may be provided an additional notch, or notches, on the frame members for accommodating the elongated portion of the axle that is away from the offset attachment bracket to better accommodate heavier bike or carrying capacity loads.

In an alternate embodiment and in accordance with this aspect of the invention, the detachable elongated axle member is extendable such that the rotatable auxiliary wheels on the detachable auxiliary axle member are further apart during an extended orientation and adapted for greater stability for auxiliary wheeling of the bike in a folded orientation. This extensibility capability, together with lateral or pivotable repositionability of the elongated axle, may also help facilitate the formation of a stable isosceles triangle-shaped base with the center of rotation of the at least one caster wheel being positioned on a bisecting centerline of the triangle for improved stability during shopping cart type rolling.

In accordance with one or more aspects of the invention, in an embodiment of the invention, the provision of an at least one supporting side frame member further comprises a plurality of supporting side frame members, each of the plurality of supporting side frame members having first and second ends, wherein the first end of each supporting side frame member is attached to the upper auxiliary wheel system frame member, wherein the second end of each supporting side frame member is adapted for attachment to a corresponding supporting strut of the foldable bike. This structure provides that the upper auxiliary wheel system frame member may be positioned adjacent an upper portion of the primary wheel in an unfolded, ridable, orientation of the bike.

In accordance with an aspect of the invention, there is provided a multi-mode auxiliary wheel system adapted for luggage cart type transport and wheeling of the folded bike when the detachable elongated axle member is attached to the upper auxiliary wheel system frame member via the first attachment receptacle, and wherein the multi-mode auxiliary wheel system is adapted for shopping cart type transport and wheeling of the folded bike when the detachable elongated axle member is attached to the upper auxiliary wheel system frame member via the second attachment receptacle.

In accordance with another aspect and embodiment of the invention, there is provided a multi-mode auxiliary wheel system as previously set forth, wherein the at least one swivel caster wheel further comprises an extensible caster axle adjustable between first and second positions. In accordance with this aspect of the invention, the at least one swivel caster wheel is retractable and extensible on an extensible caster axle so as to be user-positionable to the same level as the other auxiliary wheels (e.g., for shopping cart mode operation), above the level of the other auxiliary wheels (e.g., for luggage rack type mode operation—understanding that the swivel caster wheel is positioned underneath the bike during auxiliary wheeling modes). The swivel caster may also be upper-positionable extendable during upright bike riding mode depending on user preferences and system configuration. In this way, since the swivel caster wheel would be below the surface of the auxiliary wheel system frame member during a shopping cart mode of use, it is thus made available to support weight of the folded bike, through the framework of the auxiliary system frame member, together with the other auxiliary wheels of the system. Thus, the swivel wheel can be slideable into a position up, or down on its swivel caster axle. In the down position, the wheel is not able to swivel and the wheel top may be laid flush with the rack or frame upper surface. Chief among the advantages of this arrangement are the following: the swivel wheel, aka omnidirectional wheel, is protected from a load sitting on top of the rack, the swivel wheel can be positioned close to the rack frame with its swivel movement not being interfered, and the system gives plenty of ground clearance in operation. A disadvantage of this configuration is the extra work, requiring user to act addition swivel. It is possible to have a non-slidable swivel wheel, where the wheel is on level or slightly above the rack's top surface at all times during riding mode. This system is simple to construct, and easy to use, but may suffer relative to the above-described advantages of a slidable, extensible and retractable, swivel wheel system.

In accordance with another aspect of the invention, there is provided a multi-mode auxiliary wheel system and foldable bike combination adapted for rolling the foldable bike when in a folded condition, comprising: a bike having a foldable frame supporting a rear wheel and a front wheel, the rear wheel supported by a riding wheel axle and a plurality of supporting lateral struts of the foldable frame, the foldable frame further comprising a transverse interconnecting member interconnecting the plurality of lateral struts, the rear wheel, supporting lateral struts and transverse interconnecting member combination being pivotable together about a bike frame articulation joint to a folded position wherein the rear wheel, supporting lateral struts, and transverse interconnecting member are positioned upside down while the bike is in a folded non-ridable configuration.

This embodiment and aspect of the invention further comprises an upper auxiliary wheel system frame member attached to the foldable frame of the bike, at least one supporting side frame member having first and second ends, the first end attached to the upper auxiliary wheel system frame member and the second end attached to a supporting strut of the foldable bike so that the upper auxiliary wheel system frame member is positioned adjacent an upper portion of the rear wheel in an unfolded, ridable, orientation of the bike, and at least one attachment receptacle on at least one of the transverse interconnecting member and the upper auxiliary wheel system frame member.

This embodiment and aspect of the invention further comprises an elongated axle member adapted for attachment to the at least one attachment receptacle and adapted for repositioning to a plurality of different positions relative to the foldable frame of the bike. There are further provided a plurality of auxiliary wheels rotatably mounted on the elongated axle member adapted for displacement, transpositioning, or horizontal pivoting, to a plurality of positions relative to the attachment of the elongated axle member at the at least one attachment receptacle.

This embodiment and aspect of the invention further comprises at least one omnidirectional (e.g., swivel caster) auxiliary wheel mounted on the upper auxiliary wheel system frame member, wherein in a position of displacement of the auxiliary wheels mounted on the elongated axle member on the upper auxiliary wheel system frame member the multi-mode auxiliary wheel system is adapted for shopping cart type auxiliary wheeling of the folded bike during which each of the plurality of rotatable auxiliary wheels mounted on the elongated axle member and the at least one swivel caster auxiliary wheel all would touch the ground.

The embodiment in accordance with this aspect of the invention may further comprise another attachment receptacle, wherein the at least one attachment receptacle is on the transverse interconnecting member and the another attachment receptacle is on the upper auxiliary wheel system frame member. In such an embodiment, the elongated axle member is preferably repeatedly detachable and re-attachable such that the elongated axle member is adapted for temporary attachment to the another attachment receptacle on the upper auxiliary wheel frame member for luggage cart type auxiliary wheeling operation, and alternatively on the at least one attachment receptacle on the transverse interconnecting member for shopping cart type operation together with the swiveling caster auxiliary wheel.

It will be appreciated by those skilled in the art that greater stability of the invention may be achieved alternatively with a longer axle able to be retained on the bike in the slip stream of motion of the bike, but in such a fashion so as to not interfere with motion, pedaling or otherwise, of the rider, or alternatively with an extensible axle. It will be appreciated by those skilled in the art that, of course, a longer axle if allowed to protrude out of the slip stream, or otherwise so as to impede the motion of the rider during pedaling of the bike, could cause a dangerous condition when riding. Thus, alternatively, there is provided with a multi-mode auxiliary wheel system in accordance with an embodiment and aspect of the invention, an elongated axle member which is to some degree extendable such that the rotatable auxiliary wheels on the detachable auxiliary axle member are further apart during an extended orientation and adapted for greater stability for auxiliary wheeling of the bike in a folded orientation.

In accordance with one or more embodiments and aspects of the invention, there may be preferably provided quick-release attachment and detachment means, such as for example quarter-turn fastening type hardware, wherein there is provided a first attachment receptacle and a second attachment receptacle adapted for receipt and release of the fastening hardware for easy and quick attachment of, and quick detachment of, the detachable elongated axle member to and from the upper auxiliary wheel system frame member. In accordance with this aspect of the invention, it will be appreciated that other quick-release attachment and detachment systems may be conceived and applied, such as clips or straps, without departing from the true scope and spirit of the invention as claimed.

In accordance with one or more aspects and embodiments of the invention, there is provided a multi-mode auxiliary wheel system, adaptable for attachment to a rearward portion of a foldable bicycle, comprising: a frame member, an elongated axle of a length longer than the foldable bicycle width, auxiliary wheels mounted rotatably at the ends of the axle, a support structure fixedly connected to the frame member, an omnidirectional auxiliary wheel pivotably, detachably, retractably, or otherwise fixed to the support structure or frame member and positioned laterally with respect to the bicycle rear wheel, wherein the axle is moveably connected to the frame member and moveable into at least two different positions with respect to the omnidirectional wheel. Thus, when the elongated axle is in a transverse position, the auxiliary wheels and the omnidirectional wheel are configured in the form of an isosceles triangle with the omnidirectional wheel positioned on a center line, and such that when the rear bicycle wheel is flipped upside down the auxiliary wheels and the omnidirectional wheel touch the ground to support the folded bike in a shopping mode configuration.

When the elongated axle is in a lateral position, the elongated axle is positioned roughly preferably 90 degrees from the transverse position, so as to be in a slip stream of the bicycle in a ridable, lateral position, configuration such that the elongated axle and the auxiliary wheels won't interfere with pedaling which would cause a dangerous condition when riding if an otherwise long axle were allowed to protrude out of the slip stream of the bike or into the rider's pedaling area of the bike. Thus, in accordance with the various embodiments of the invention, the elongated axle may be repositionable to transverse and lateral positions by pivoting, or otherwise moving or rotating, the axle about a substantially vertical axis. In such an embodiment, the elongated axle may be fixable at each the transverse and the lateral positions by a retaining member such as a clip or other retaining member receptacles taught herein or known to those skilled in the art.

The foregoing aspects and embodiments of the invention address the limitations of prior art systems by providing for greater stability, greater functionality and greater ease of use during auxiliary wheeling of a folded bike. Further, by providing for a longer axle movable into of the slipstream of the bike, and away from motion of the rider during pedaling, while still allowing repositioning of the axle for such greater stability and usefulness of the system during auxiliary wheeling, the system enhances safety and usability for users. Further, because the system enables and incorporates an isosceles triangle configuration shaped base, with the swiveling omnidirectional caster wheel on the bisecting centerline of the triangle, steering and stability are enabled and improved over prior art systems.

The subject matter of the present invention is particularly pointed out and distinctly claimed in the concluding portion of this specification. However, both the organization and method of operation, together with further advantages and objects thereof, may best be understood by reference to the following descriptions taken in connection with accompanying drawings wherein like reference characters refer to like elements.

DESCRIPTION OF EMBODIMENTS

Folding Frame Bikes Generally

Figure 1:
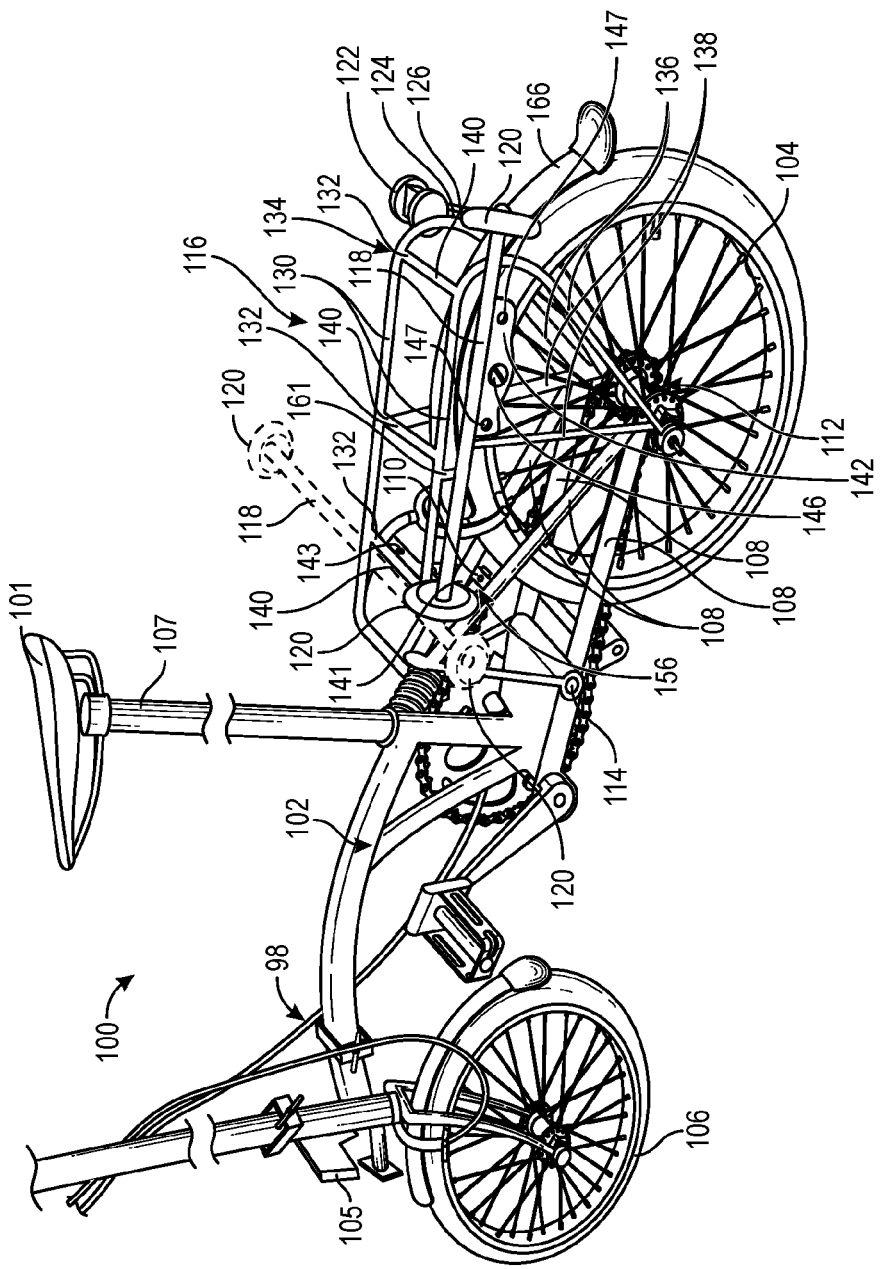
FIG. 1 is a perspective side view of a rack embodiment, in accordance with one or more aspects of the invention, of a multi-mode system for rolling a foldable bike, such as a Brompton® brand bike of the type having the rear wheel fold about folding points 98, 114 on the frame such that the rear wheel and rear wheel supporting framework of the bike would be positioned upside down, with the multi-mode system installed on the bike, but with the bike shown in an unfolded (ridable) position.
Figure 2:
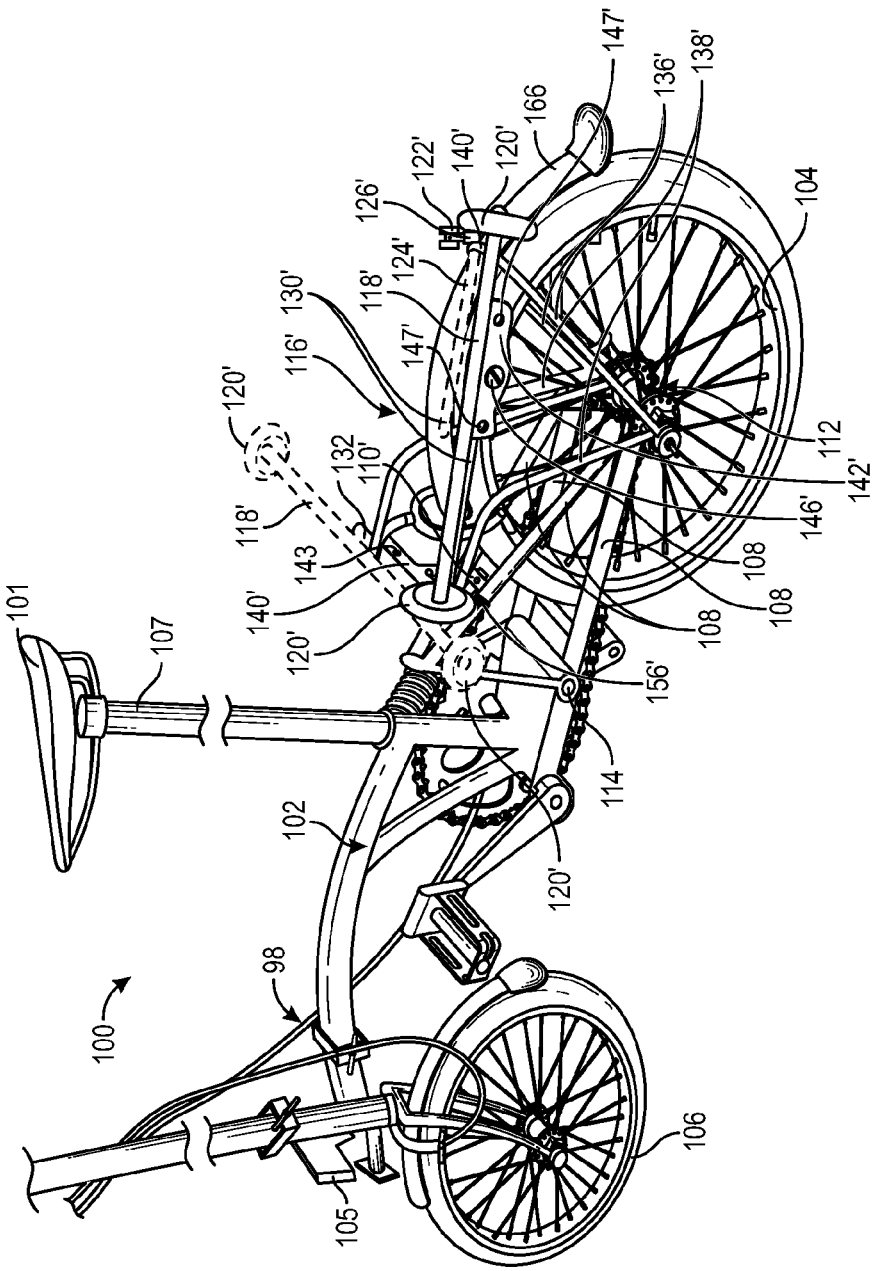
FIG. 2 is a perspective side view of another embodiment, in accordance with one or more aspects of the invention, this embodiment not having an upper rack, of a multi-mode system for rolling the same type of folded bike as the bike shown in FIG. 1, shown with the bike in an unfolded (ridable) position.
Figure 3:
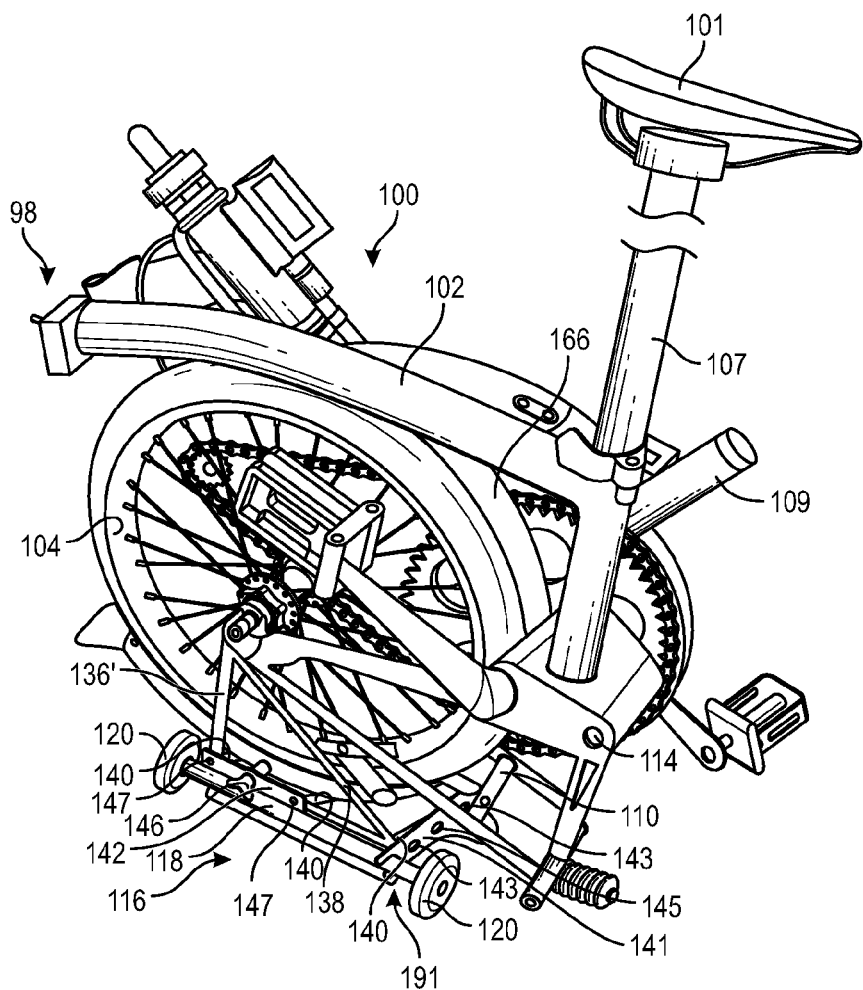
FIG. 3 is a side perspective view of the rear rack embodiment of the system for rolling a folded bike (such as that shown with a different configuration of the bike in FIG. 1), but with the bike in a folded (non-ridable) position resting on a plurality of auxiliary wheels of the multi-mode system and adapted to be tilted by a user for transport in a luggage cart type mode with the push or pull of a user's hand.

Referring to the Figures, there have been provided foldable bicycles, commonly known as bikes, 100 (as shown in FIGS. 1 and 2) which have facilitated travel by cyclist users, while also providing a relatively compact folded bike package 100 (generally as shown in FIGS. 3 and 4) able to be carried or wheeled by the user while, for example, traveling on public transportation, while walking through a building, while walking on a busy sidewalk, while shopping in a grocery store, or while walking up a flight of stairs, etc. A particular type of such foldable bike 100 is characterized in a bike 100 having a foldable frame 102 supporting a rear wheel 104 and a front wheel 106, the rear wheel supported by a riding wheel axle 112 and a plurality of supporting lateral struts 108 of the foldable frame (lateral in the sense that the struts are alongside the rear wheel 104 relative to its intended direction of travel in a riding mode). The foldable frame 102 further comprises a particular transverse interconnecting frame member 110 interconnecting two of the plurality of lateral struts 108 to help lend strength and stability to the bike frame 102. In one type of foldable bike 100, the rear wheel 104, with the supporting lateral struts 108, and the transverse interconnecting member 110 combination are pivotable together about a rear bike frame articulation joint 114 to a folded position wherein the rear wheel, supporting lateral struts, and the transverse interconnecting member are positioned upside down while the bike is in a folded non-ridable configuration.

Auxiliary Wheeling Modes Generally

Figure 4A:
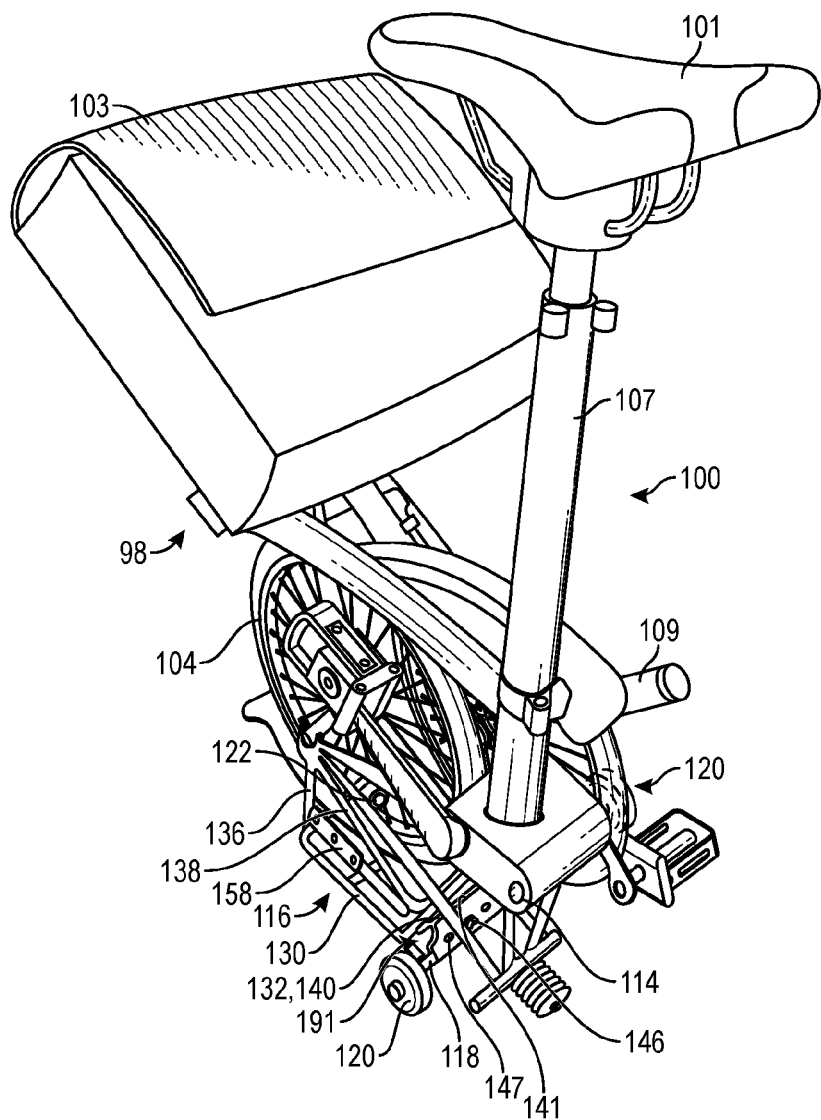
FIG. 4A is a rear perspective view of the embodiment of the system for rolling a folded bike (such as that shown with a different configuration of the bike in FIG. 1), but with the bike in a folded (non-ridable) position with a bag attachment for carrying groceries and ready for moving by a user's hand on a plurality of auxiliary wheels and an omnidirectional, aka swivel caster, wheel, each such wheel being part of the multi-mode system for transport in accordance with one or more aspects of the invention, in a shopping cart type wheeling mode.
Figure 4B:
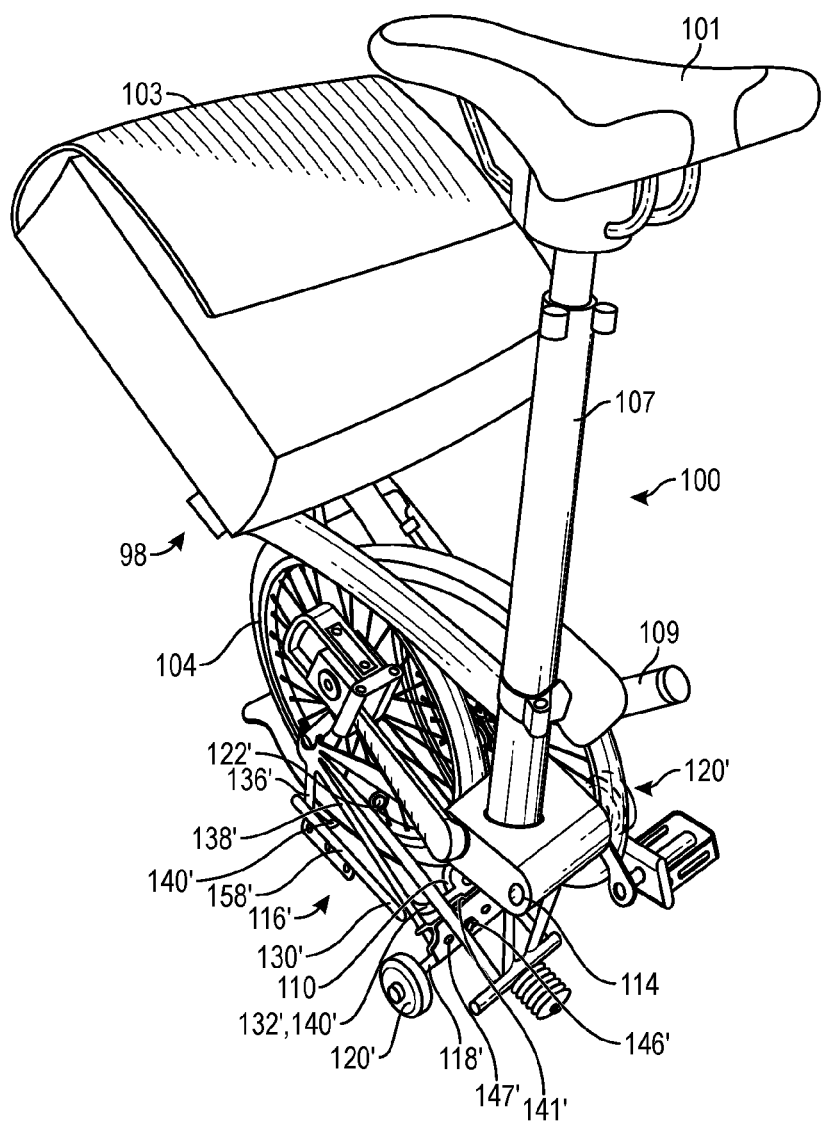
FIG. 4B is a rear perspective view of a no-rack embodiment of the system for rolling a folded bike (such as that shown with a different configuration of the bike in FIG. 2), but with the bike in a folded (non-ridable) position with a bag attachment for carrying groceries and ready for auxiliary moving by a user's hand on a plurality of auxiliary wheels and an omnidirectional, aka swivel caster, wheel, each such wheel being part of the multi-mode system for transport in accordance with one or more aspects of the invention, in a shopping cart type wheeling mode.

There are presented multiple embodiments of multi-mode auxiliary wheel systems 116, 116', 116" herein, wherein a user is supported in two primary modes of auxiliary transportation with the present invention usable with foldable bikes 100: a rolling luggage cart type mode configuration of wheels generally as illustrated in FIG. 3 and further described herein, and a rolling shopping cart type mode configuration of wheels generally as illustrated in FIGS. 4A and 4B and further described herein. In the rolling luggage cart type mode of auxiliary transport, or wheeling, of a folded bike 100, a user is enabled in grabbing a highermost, or extended, portion of the folded bike, such as a bike seat 101 on a seat post 107, a handle bar 109, or even a portion of the bike frame 102, depending on the manner of folding of the bike, in order to tip the folded bike onto preferably non-swiveling (i.e., fixed in one axis of rotation, but nevertheless rotatable) wheels in a laterally-oriented configuration generally as shown in FIG. 3, so that the user is enabled in auxiliary wheeling of the folded bike, much like a user of a large suitcase might do on wheels mounted on the bottom of the suitcase. And since the present invention provides a more stable wheelbase, usable in either or both modes of auxiliary transport with an elongated axle, stability of wheeling is enhanced even in the luggage cart mode of wheeling.

In the rolling shopping cart type mode of auxiliary transport, or wheeling, of a folded bike 100, though the user is still enabled in grabbing the highermost, or extended, portion of the bike (such as seat 101 on the seat post 107 as with the aforementioned type of transport), the user in this case does not tip the bike onto non-swiveling wheels 120, but rather the folded bike is free to rest upright on the multi-mode auxiliary wheel system 116, 116', 116" comprised of a swiveling caster wheel, i.e., omnidirectional wheel, 122, and of a transversely-oriented configuration of wheels 120 as shown in FIGS. 4A and 4B. This, in turn, allows the user to move the bike omnidirectionally on a flat surface, such as the surface of a grocery store or other shopping mall. For the shopping cart mode type of transport, there is provided an attachment member 105 by bike manufacturers, for example an attachment member 105 positioned under handle bar portions of the folded bike 100, for holding an openable container 103 adapted for the placement of grocery items, or other purchased items, in the container, to be wheeled about in the shopping cart mode on the multi-mode auxiliary wheel system 116, 116', 116" of the present invention. And since the present invention provides a more stable wheelbase, usable in either or both modes of auxiliary transport with an elongated axle, but especially in the shopping cart mode of auxiliary transport, stability of auxiliary wheeling is enhanced, and thus the use of container 103 is better encouraged and supported with less likely tipping of the bike 100 with consequent spilling, or damaging, of the contents of the container. In the present context, an omnidirectional wheel is considered in its generic meaning, namely a wheel, such as a swivel caster wheel, that is capable of wheeling in any direction in the plane of the surface on which the wheel is rolling. Thus, in this disclosure omnidirectional and swivel caster wheels are interchangeable.

Rack Frame Embodiment

To address limitations of the prior art to facilitate auxiliary wheeling transport of foldable bikes 100 generally, while improving upon the stability, steering, functionality, mobility and ease of use of auxiliary wheeling transport of foldable bikes, all while also not impeding use of the bikes during riding mode, that is, without impeding safe pedaling and use of such bikes, there is shown in FIGS. 1, 3, 4A, and 5 a first embodiment of a novel multi-mode auxiliary wheel system 116 comprising an elongated axle 118, smaller auxiliary wheels, or rollers, 120 mounted rotatably at the ends of the elongated axle, and an omnidirectional wheel 122, such as a swivel caster wheel, placed laterally with respect to the rear wheel 104 of the bike.

In this embodiment, the multi-mode auxiliary wheel system 116 may comprise an upper lateral frame member 130 interconnected with stabilizing transverse cross frame members 132 to form an upper rack member 134. As will be appreciated, the term "upper" is used herein to denote the rack 134 when the bike 100 is in an upright, non-folded, and ridable condition, since when the bike (generally of the type shown in FIGS. 1 and 2) is in a folded condition, the rack 134 would be between the rear wheel 104 and the ground. The rack 134 is adapted for attachment to the bike 100 such that during a ridable non-folded condition of the bike, the rack 134, otherwise known as an upper auxiliary wheel system rack frame member 134, serves an additional purpose of providing a flat surface for a user to support and secure books, groceries, and the like while riding the bike.

The multi-mode auxiliary wheel system 116 may further comprise a plurality of aft supporting side frame members 136, a plurality of forward supporting side frame members 138, and a plurality of transverse frame members 140 (also known as transverse cross frame members 132 of rack 134 in this embodiment). The plurality of supporting side frame members 136, 138, and the plurality of transverse frame members 140, are adapted for positioning adjacent an upper portion of each side of the rear wheel 104 of the bike 100, such that the supporting side frame members form an angular V-shaped and wedge-shaped framework wherein an upper portion of each side frame member on either side of the rear wheel is interconnected via a transverse frame member 140 (which is the same in this case as transverse cross frame member 132 of rack 134). Further, each supporting side frame member 136, 138 essentially interconnects the lateral frame members 130 and transverse frame members 140 (132) to rear wheel 104 axle 112, and hence to rear wheel supporting struts 108 of the foldable bike frame 102. This interconnection is accomplished via a plurality of eyelet, or quick-release slots, 113, at a position near a converging point of the wheel supporting struts 108 where the wheel supporting struts and the supporting side frame members 136, 138 interconnect the frame 102 of the bike 100, and the multi-mode auxiliary wheel system 116 (via eyelets 113), respectively, adjacent the axle 112 of the rear wheel 104 in a manner, and suitably made of high-strength steel, or other metal material suitable to the purpose, as will be appreciated by those skilled in the art of manufacture and attachment of bike racks and bike frames generally. During riding mode of the bike 100, the upper lateral support frame members 130 and the transverse frame members 132 (140) are generally oriented horizontal with the ground and are positioned above wheel 104. However, during auxiliary wheeling mode, these same upper lateral support frame members 130 and transverse frame members are flipped upside down through the action of pivoting of the bike 100 (of the type shown in FIGS. 1 and 2) during folding thereof, so as to be positioned generally oriented horizontal and between the rear wheel 104 and the ground.

Thus, in either condition, whether during riding mode or during either type of auxiliary wheeling mode, the aforementioned elongated axle 118, smaller auxiliary wheels 120 mounted rotatably at the ends of the elongated axle, and omnidirectional wheel 122, such as a swivel caster wheel, are repositionably fixed relative to the rack 134 and rear wheel 104. In the shopping cart type mode of auxiliary transport, the system 116 facilitates repositionably fixing of the wheels 120 and 122 preferably in an isosceles triangle base configuration. In the luggage cart type mode of auxiliary transport, the auxiliary wheels 120 mounted at the ends of axle 118 are preferably repositionably located laterally relative to the rack 134 and rear wheel 104. Further, in the luggage cart type mode, the swivel caster wheel 122 may preferably remain in a retracted position above a ground plane, as further described below, or alternatively may simply be used as a means for supporting the folded bike 100 upright while the user stands still and is not engaged in auxiliary movement of the folded bike.

Figure 5:
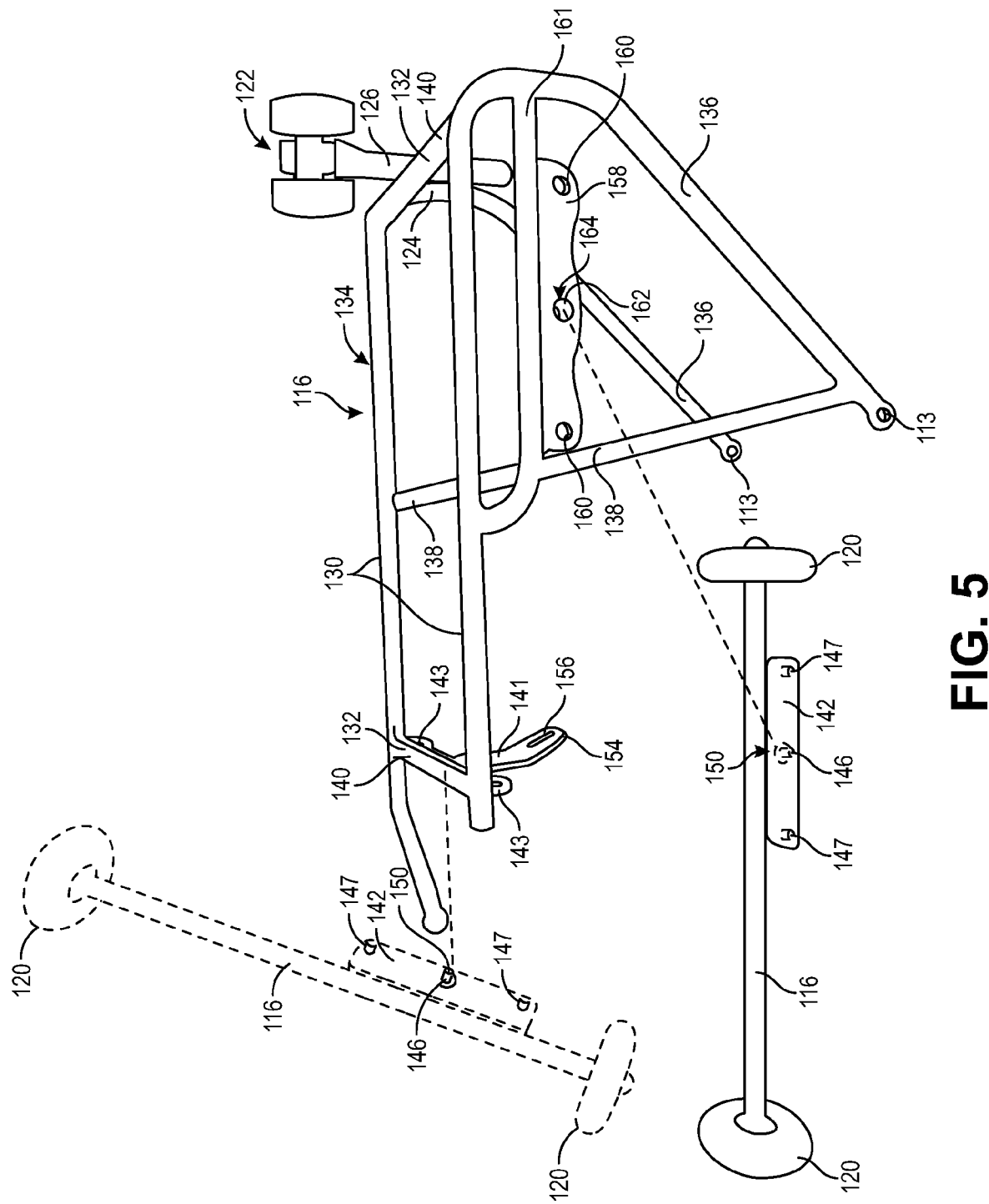
FIG. 5 is a partially exploded side perspective view of a rear rack embodiment of the multi-mode system for rolling a folded bike (such as that shown with a bike in FIG. 1), used for both luggage cart type and shopping cart type transport modes, and with an omnidirectional, or swivel caster, wheel, used for both free standing of a folded bike and shopping cart type transport mode.
Figure 10:
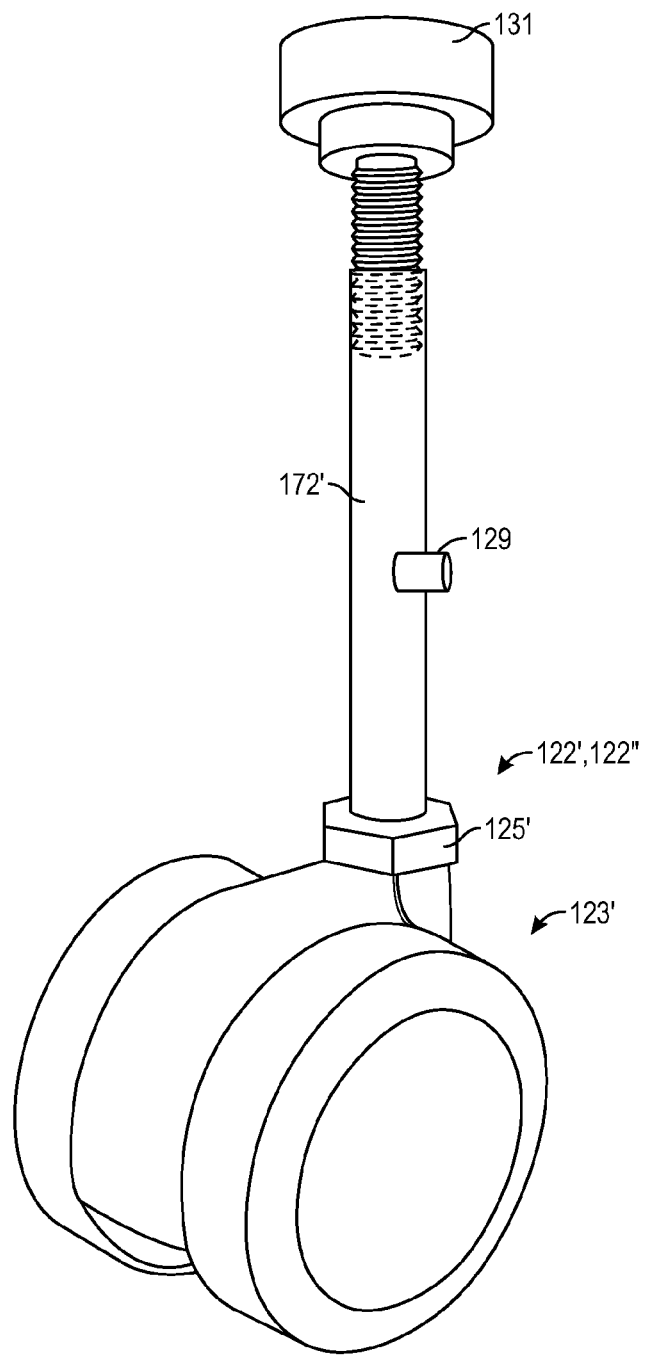
FIG. 10 is a perspective view of a preferred extensible and retractable omnidirectional wheel, or swivel caster wheel (aka swivel wheel, or caster wheel) usable for each of the embodiments of the invention, it being appreciated by those of skill in the art that other types of omnidirectional wheels may be suitable used in connection with the invention without departing from the true scope and spirit of the invention as claimed.

There is provided a frame member support structure 124 and retaining tube 126 within which the omnidirectional wheel 122 may be pivotably connected to the bike rear frame (for example via the upper lateral side member 130 as shown in FIG. 5). The omnidirectional wheel 122 may be permanently attached to the bike 100 via the support structure 124 and retaining tube 126, or alternatively as shown in FIG. 10, and preferably, there is provided a removable/retractable omnidirectional wheel 122' which may be implemented with any embodiment of the invention. As shown in FIG. 10, a removable/retractable omnidirectional wheel 122' comprises a wheel portion 123', a tightening nut 125', an inner tube shaft 127', a spring-loaded retention pin 129 extending midway from an orifice in the inner tube shaft 127', and a threaded cap retaining member 131 adapted for holding the retractable omnidirectional wheel 122' in the outer retaining tube 126.

In operation, the inner tube shaft 127' may be inserted into the retaining tube 126 on the support structure 124, until the spring-loaded retention pin or button 129 abuts an upper rim as shown in FIG. 2. Then, to retain the inner tube shaft 127' and retractable omnidirectional wheel 122' in the tube at an extended position, for example with the omnidirectional wheel extended above the plain of the rack 134 (during a riding mode orientation of the bike 100), the threaded cap retaining member 131' may be screwed into the end of the inner tube shaft (which shaft is threaded on the inside), such that the cap retaining member holds the inner tube shaft and omnidirectional wheel in place in their extended position. Then, to retract the omnidirectional wheel 122', the user may depress the spring-loaded pin or button 129 such that the tube shaft 127' may be pushed into the tube until the button either engages a recessed portion, or hole, in the inner side of the retaining tube 126 in order to hold the omnidirectional wheel in its retracted position in the retaining tube.

Figure 11A:
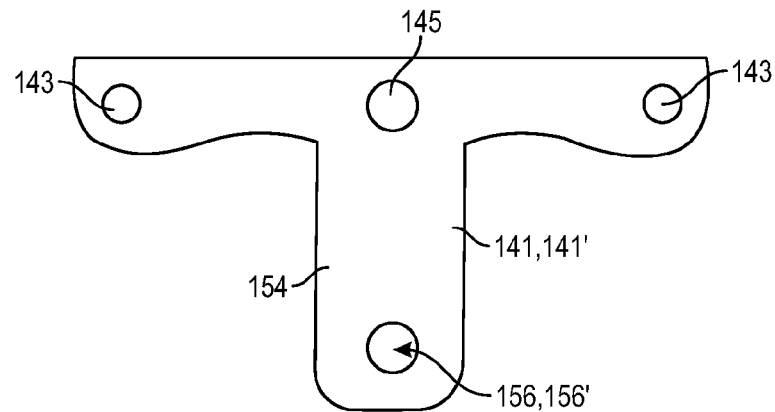
FIG. 11A is a top plan view of a face plate having holes, adapted for receipt and engaging with the auxiliary wheel axle in transverse orientation and using, for example, a spring-loaded, quarter-of-a-turn type of bolt fastener, all as part of the hardware for quick attachment and detachment of the auxiliary wheel axle portion to a multi-mode system for rolling a foldable bike in accordance with the present invention, as well as a hole for attachment of a front portion of the multi-mode system for rolling a foldable bike, in accordance with various embodiments shown and described herein, to a transverse support frame member of a Brompton® Brand bike.
Figure 11B:
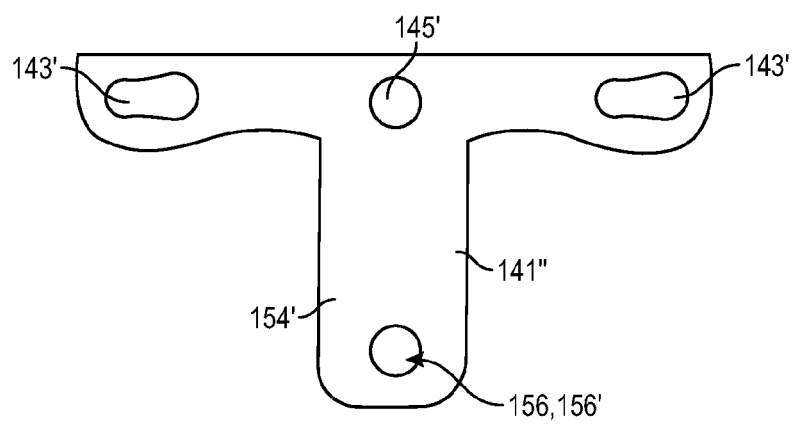
FIG. 11B is a top plan view of an alternate face plate having standard slots, adapted for receipt and engaging with the auxiliary wheel axle in transverse orientation and using, for example, a standard, spring-loaded, quarter-of-a-turn type of bolt fastener, all as part of the hardware for quick attachment and detachment of the auxiliary wheel axle portion to a multi-mode system for rolling a foldable bike in accordance with the present invention, as well as a hole for attachment of a front portion of the multi-mode system for rolling a foldable bike, in accordance with various embodiments shown and described herein, to a transverse support frame member of a Brompton® Brand bike.

Preferably, the rack 134 is generally rectangular so as to have a forward end and an aft end. At either end of the rack 134, but at least preferably at the forward end of the rack, there is provided a transverse frame member and attachment plate 141, but note that in a multi-mode auxiliary wheel system and bike combination, the attachment plate 141, or transverse or other frame members of the invention, may be part of the frame of the bike 100 itself (e.g., cross member 110), with other frame members of the system depending from bike frame members in such a case. Attachment plate 141 comprises, in an embodiment, a plurality of dispersed alignment holes or slots 143, as described further in connection with FIGS. 11A and 11B.

Preferably, the elongated axle 118 further comprises a corresponding attachment plate 142 welded thereon, with protruding guide and alignment pins 147 corresponding with each alignment hole 143 or slot 143'. Preferably centrally located on attachment plate 142, there is further provided a spring-loaded, quarter-turn quick-release hardware system attachment member 146 known in the art of quick-release attachment and detachment.

Thus, further, preferably in connection with an embodiment of the invention, attachment plate 141 also comprises a central hole 145, which together with female attachment hardware installed therein comprises an attachment receptacle 149, adapted for retaining the keyed attachment member 146 mounted in corresponding attachment plate 142 of axle 118. Thus, in accordance with this embodiment and this type of quick-release hardware, upon turning a male protruding pin 150 of the keyed attachment member 146 a quarter of a turn, the key on the axle 118 engages and locks the axle into position, together with the retaining guides or pins 147 retained in dispersed guide holes 143. Detachment of the axle 118 is accomplished with this same process but performed in reverse to disengage the keyed attachment member 146 from the attachment receptacle 149 to allow repositioning of the axle to another location, for example to another laterally positioned attachment receptacle described further below.

Alternatively, as disclosed in a previous provisional patent application referenced herein, such quick release system may comprise a generally rectangular bracket adapted for receiving a partially rectangular axle member, together with guide and retaining pins and slots as disclosed therein, without departing from the scope and spirit of the present invention.

Attachment plate 141 further comprises a T-shaped base member 154 defining a hole 156 therein and adapted for interconnecting the attachment plate 141 with the cross member 110 of the bike frame 102 for further attaching and stabilizing the system 116 on the bike frame. This may be easily accomplished with a standard nut and bolt combination, a hand-operable quick release threaded screw and nut (or as threaded and tightened into the cross member 110 itself).

In a preferred embodiment, there is also provided a lateral attachment plate 158 on lateral frame member 130, or preferably a lower lateral support structure 161. Similar to attachment plate 141, attachment plate 158 comprises, in an embodiment, a plurality of dispersed alignment holes or slots 160. And similar to attachment plate 141, attachment plate 158 is adapted to receive the elongated axle 118 further comprising a corresponding attachment plate 142 welded thereon, with protruding guide and alignment pins 147 also corresponding with each guide or alignment hole or slot 160, as well as the spring-loaded, quarter-turn quick-release hardware system attachment member 146 of the elongated axle 118.

Thus, further, preferably in connection with an embodiment of the invention, attachment plate 158 also comprises a central hole 162, which together with female attachment hardware installed therein comprises an attachment receptacle 164, adapted for retaining the keyed attachment member 146 mounted in corresponding attachment plate 142 of axle 118. Thus, upon turning the male protruding pin 150 of the keyed attachment member 146 a quarter of a turn, the key on the axle 118 engages and locks the axle into position, together with the retaining guides or pins 147 retained in dispersed guide holes 160. Detachment of the axle 118 is accomplished with this same process but performed in reverse to disengage the keyed attachment member 146 from the attachment receptacle 164 to allow repositioning of the axle to another location, for example back to attachment plate 141 with attachment receptacle 149 described previously.

It will be appreciated by those skilled in the art that there are several different ways to configure the frame, attachability/detachability of the various embodiments of the invention, and auxiliary wheel configuration, whether with two wheels, three wheels, or four wheels, based on the disclosure herein, without departing from the invention in its broader aspects as claimed.

Hence, the attachment system may comprise a square channel tube with a plurality of pins and cuts into the channel for receiving and retaining a square portion of an axle may be employed to enable detachability, and reattachability, of the axle on the system framework without departing from the scope of the invention as claimed, wherein the axle may be pivoted, or displaced, through any of a number of different degree orientations, but most suitably at 90° orientations as shown, for repositioning the axle for convenient auxiliary wheel mode changes.

Reduced-Frame Embodiment

Figure 6A:
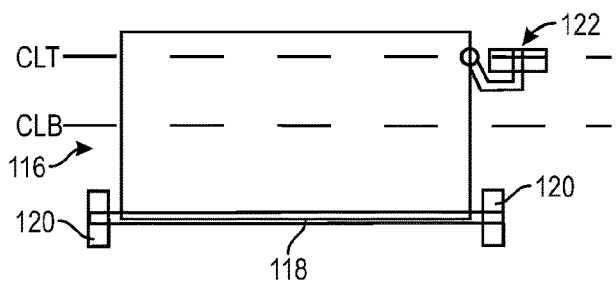
FIG. 6A is a top schematic view representative of the multi-mode system for rolling a folded bike in accordance with the various embodiments of the invention shown and described herein, and for facilitating showing and describing the enhanced stability and steering capability of the present repositionable wheels and elongated axle aspects of the invention over the prior art, while showing the axle repositioned for luggage cart type mode of auxiliary transport.
Figure 6B:
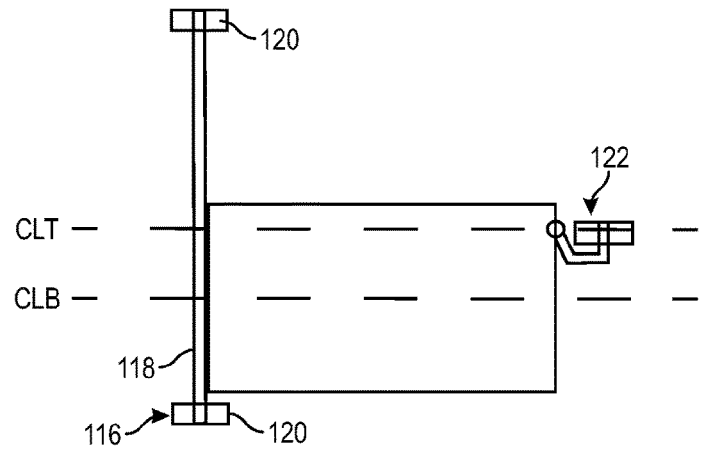
FIG. 6B is a top schematic view representative of the multi-mode system for rolling a folded bike in accordance with the various embodiments of the invention shown and described herein, and for facilitating showing and describing the enhanced stability and steering capability of the present repositionable wheel and elongated axle aspects of the invention over the prior art, but while showing the axle repositioned for shopping cart type mode of auxiliary transport.
Figure 7:
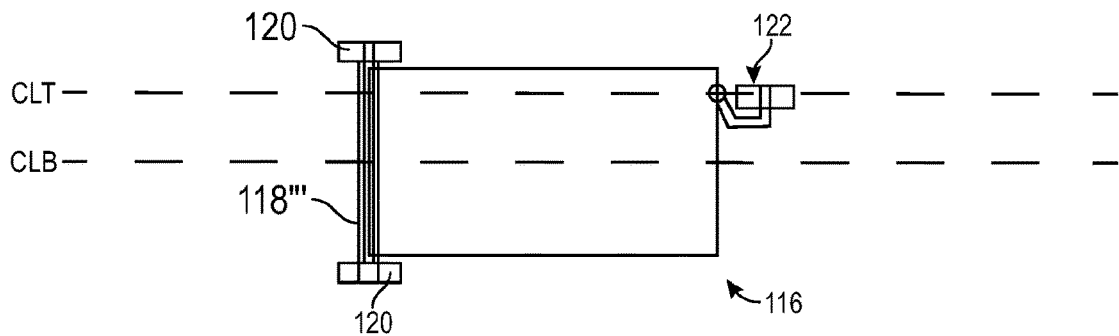
FIG. 7 is a top schematic view of an alternative extensible axle system for rolling a folded bike, whether with a repositionable axle system or not in accordance with the present invention, for facilitating showing and describing the enhanced stability and steering capability of the present repositionable wheel and elongated axle aspects of the invention over the prior art, with the system shown in shopping cart type mode position, but with the axle not extended (as with prior art systems) such that the system may not be as stable as it may be with a longer axle embodiment.
Figure 8:
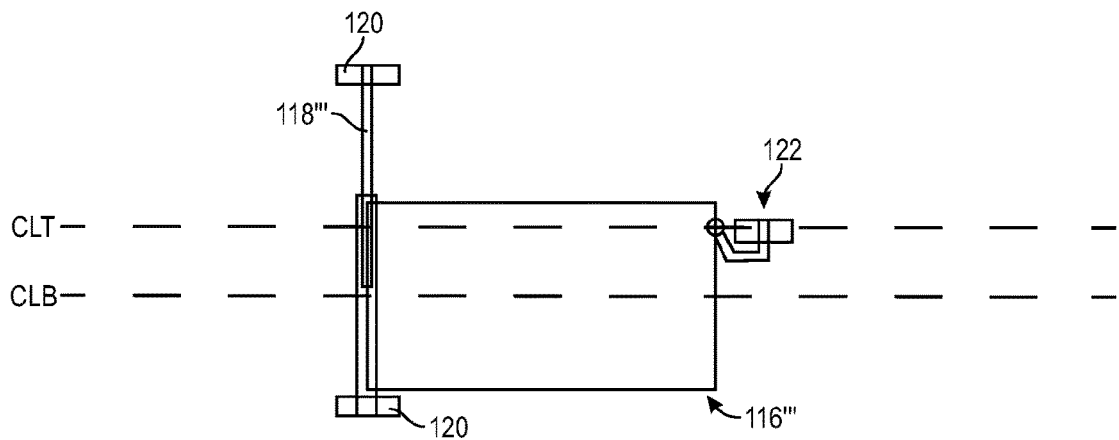
FIG. 8 is a top schematic view of the alternative extensible axle multi-mode system for rolling a folded bike, whether with a repositionable axle system or not in accordance with the present invention, for facilitating showing and describing the enhanced stability and steering capability of the present repositionable wheel and elongated axle aspects of the invention over the prior art, with the system shown in shopping cart type mode position and with the extensible wheel axle portion extended to illustrate enhanced stability.
Figure 9:
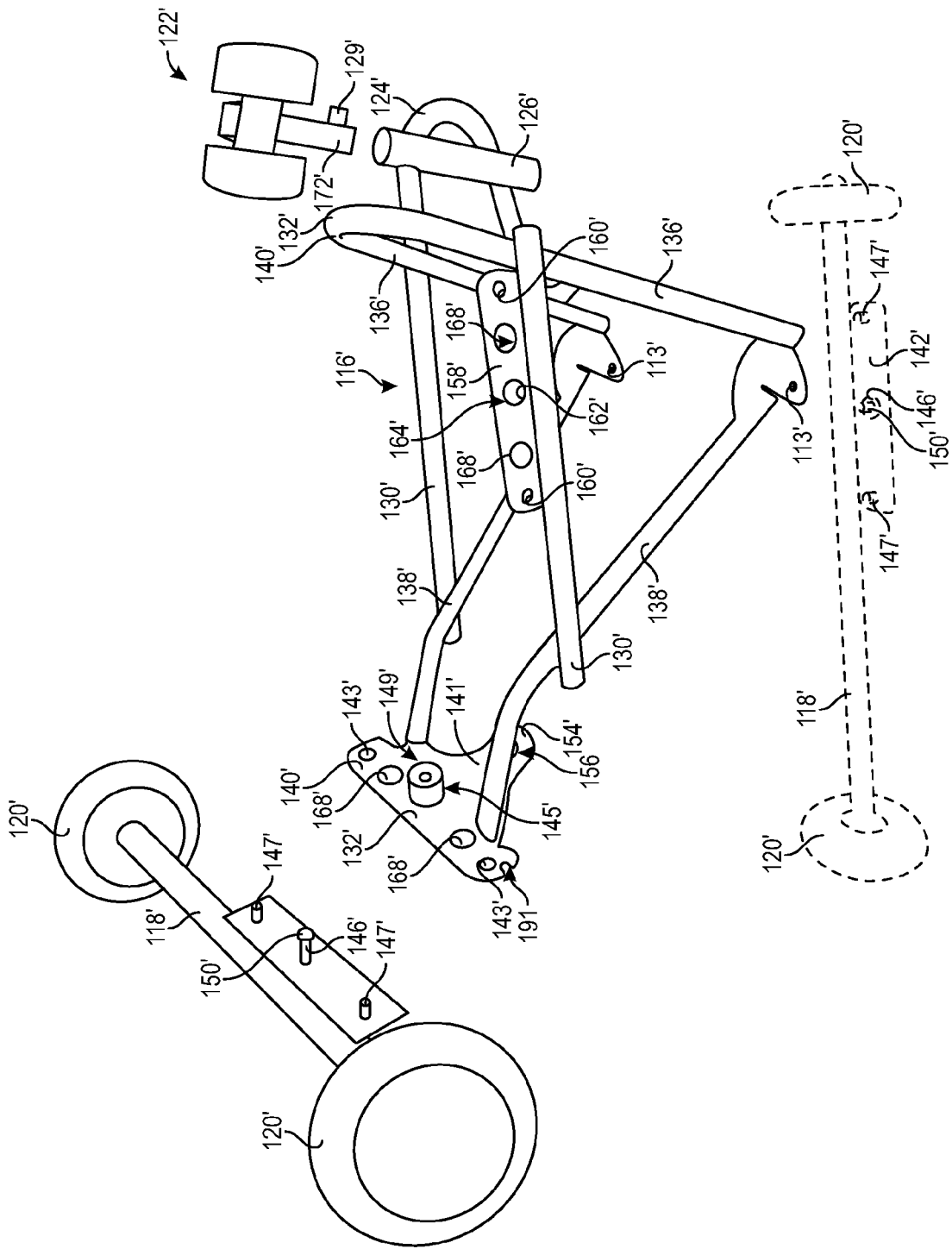
FIG. 9 is an exploded side perspective view of the embodiment of the system for rolling a folded bike, with the system shown in shopping cart type, and alternatively luggage cart type (in phantom) auxiliary transport modes.

To address limitations of the prior art to facilitate auxiliary wheeling transport of foldable bikes 100 generally, while improving upon the stability, steering, functionality, mobility and ease of use of auxiliary wheeling transport of foldable bikes, all while also not impeding use of the bikes during riding mode, that is, without impeding safe pedaling and use of such bikes, there is shown in FIGS. 2, 4B, and 9 a second, alternative, preferred, embodiment of a novel multi-mode auxiliary wheel system 116' comprising an elongated axle 118', smaller auxiliary wheels, or rollers, 120' mounted rotatably at the ends of the elongated axle, and an omnidirectional wheel 122', such as a swivel caster wheel, placed laterally with respect to the rear wheel 104 of the bike as illustrated in FIGS. 6-8.

In this embodiment, the multi-mode auxiliary wheel system 116' comprises an upper lateral frame member 130' interconnected with stabilizing transverse cross frame members 132'. A primary difference between this embodiment of the system 116' and the previously described embodiment 116, is that this system embodiment 116' does not form an upper rack member 134. As will be appreciated, the term "upper" is used herein to denote the fact that the upper lateral frame member 130' is above a horizontal bisecting line of the rear wheel 104 when the bike 100 is in an upright, non-folded, and ridable condition, since when the bike (generally of the type shown in FIGS. 1 and 2) is in a folded condition, the upper lateral frame member 130' would be below the horizontal bisecting line such that the system may be adapted to support the bike 100 for auxiliary mode transport on the ground as further described below.

The multi-mode auxiliary wheel system 116' may further comprise a plurality of aft supporting side frame members 136', a plurality of forward supporting side frame members 138', and a plurality of transverse frame members 140' (also known as transverse cross frame members 132' in this embodiment). The plurality of supporting side frame members 136', 138', and the plurality of transverse frame members 140', are adapted for positioning adjacent an upper portion of each side of the rear wheel 104 of the bike 100, such that the supporting side frame members form an angular V-shaped and wedge-shaped framework wherein an upper portion of each side frame member 136', 138' on either side of the rear wheel is interconnected via a transverse frame member 140'.

Further, each supporting side frame member 136', 138' essentially interconnects the lateral frame members 130' and transverse frame members 140' to rear wheel 104 riding axle 112, and hence to rear wheel supporting struts 108 of the foldable bike frame 102. This interconnection is accomplished via a plurality of eyelet, or quick-release slots, 113', at a position near a converging point of the wheel supporting struts 108 where the wheel supporting struts and the supporting side frame members 136', 138' interconnect the frame 102 of the bike 100, and the multi-mode auxiliary wheel system 116' (via eyelets 113'), respectively, adjacent the axle 112 of the rear wheel 104 in a manner that will be readily appreciated by those skilled in the art of attachment of bike racks and bike frames generally. During riding mode of the bike 100, the upper lateral support frame members 130' and the transverse frame members 140' are generally oriented horizontal with the ground and are positioned above wheel 104. However, during auxiliary wheeling mode, these same upper lateral support frame members 130' and transverse frame members are flipped upside down through the action of pivoting of the bike 100 (of the type shown in FIGS. 1 and 2) during folding thereof, so as to be positioned generally oriented horizontal and between the rear wheel 104 and the ground. Thus, in the case of the reduced frame embodiment of the multi-mode auxiliary wheel system 116', the transverse frame members and side frame members 136', 138' are positioned in a generally inverted U-shape during riding mode of the bike 100, whereas during auxiliary wheeling modes these are positioned in a generally U-shaped position with the bottom portion of the "U" positioned between the wheel 104 and the ground in order to support the bike 100 on, and allow auxiliary movement of the bike with, auxiliary wheels 120' and 122'.

Thus, in either condition, whether during riding mode or during either type of auxiliary wheeling mode, the aforementioned elongated axle 118', smaller auxiliary wheels 120' mounted rotatably at the ends of the elongated axle, and omnidirectional wheel 122', such as a swivel caster wheel, are repositionably fixed relative to the rear wheel 104 and foldable bike frame 102. In the shopping cart type mode of auxiliary transport, the system 116' facilitates fixing of the wheels 120' and 122' preferably in an isosceles triangle base configuration. In the luggage cart type mode of auxiliary transport, the auxiliary wheels 120' mounted at the ends of axle 118' are preferably positioned laterally relative to the rear wheel 104. Thus, it will be appreciated that upper lateral frame member 130' is preferably closely adjacent an upper portion of the wheel 104 in a riding mode such that upon flipping of the wheel 104 during folding of the bike, the frame member 130' will be close enough to the ground to allow sufficient clearance for the wheel 104 from the ground during luggage cart type mode though smaller auxiliary wheels 120' are in use. Further, in the luggage cart type mode, the swivel caster wheel 122' may preferably remain in a retracted position above a ground plane, or alternatively may simply be used as a means for supporting the folded bike 100 upright while the user stands still and is not engaged in auxiliary movement of the folded bike.

There is provided a frame member support structure 124' and retaining tube 126' within which the omnidirectional wheel 122' may be pivotably connected to the bike rear frame. The omnidirectional wheel 122' may be permanently attached to the bike 100 via the support structure 124' and retaining tube 126', or alternatively as shown in FIG. 10, and preferably, there is provided a removable/retractable omnidirectional wheel 122' which may be implemented with any embodiment of the invention via a frame member support structure and retaining tube as described above. As shown in FIG. 10, a removable/retractable omnidirectional wheel 122' comprises a wheel portion 123', a tightening nut 125', an inner tube shaft 172', a spring-loaded retention pin 129 extending midway from an orifice in the inner tube shaft 172', and a threaded cap retaining member 131 adapted for holding the retractable omnidirectional wheel 122' in the outer retaining tube 126'.

In operation, the inner tube shaft 127' may be inserted into the retaining tube 126' on the support structure 124, until the spring-loaded retention pin or button 129 abuts an upper rim as shown in FIG. 2. Thus, to retain the inner tube shaft 127' and retractable omnidirectional wheel 122' in the tube at an extended position, for example with the omnidirectional wheel extended above the plain of the rack 134 (during a riding mode orientation of the bike 100), the threaded cap retaining member 131' may be screwed into the end of the inner tube shaft (which shaft is threaded on the inside), such that the cap retaining member holds the inner tube shaft and omnidirectional wheel in place in their extended position. The, to retract the omnidirectional wheel 122', the user may depress the spring-loaded pin or button 129 such that the tube shaft 127' may be pushed into the tube until the button either engages a recessed portion, or hole, in the inner side of the retaining tube 126' in order to hold the omnidirectional wheel in its retracted position in the retaining tube.

Preferably, the V-shaped, wedge-shaped frame comprised of side frame members 136', 138', and transverse frame members 140' is generally rectangular in shape from a top view so as to have a forward end and an aft end and so as to appear to ride above and envelope the rear wheel in a top view thereof. At either end of this rectangular framework, as viewed in a top view, but at least preferably at the forward end of the frame work, there is provided a transverse frame member and attachment plate 141', but note that in a multi-mode auxiliary wheel system and bike combination, the attachment plate 141', or transverse or other frame members of the invention, may be part of the frame of the bike 100 itself (e.g., cross member 110), with other frame members of the system depending from bike frame members in such a case. Attachment plate 141, 141', 141" comprises, in an embodiment, a plurality of dispersed alignment holes or slots 143', as described further in connection with FIGS. 11A and 11B.

Preferably, the elongated axle 118' further comprises a corresponding attachment plate 142' welded thereon, with protruding guide and alignment pins 147' corresponding with each alignment hole 143' or slot 143". Centrally located on attachment plate 142', there further may be provided a spring-loaded, quarter-turn quick-release hardware system attachment member 146' known in the art of quick-release attachment and detachment.

Thus, further, preferably in connection with an embodiment of the invention, attachment plate 141' also comprises a central hole 145', which together with female attachment hardware installed therein comprises an attachment receptacle 149', adapted for retaining the keyed attachment member 146' mounted in corresponding attachment plate 142' of axle 118'. Thus, with this embodiment and this type of quick-release hardware, upon turning a male protruding pin 150' of the keyed attachment member 146' a quarter of a turn, the key on the axle 118' engages and locks the axle into position, together with the retaining guides or pins 147' retained in dispersed guide holes 143'. Detachment of the axle 118' is accomplished with this same process but performed in reverse to disengage the keyed attachment member 146' from the attachment receptacle 149' to allow repositioning of the axle to another location, for example to another laterally positioned attachment receptacle described further below.

Alternatively, as shown in a previous provisional patent application referenced above, a system for attachment and detachment of an axle may comprise a rectangular bracket adapted for receiving a rectangular axle member, together with guide and retaining pins and slots as disclosed therein. It will be apparent to those of skill in the art that such a system may be employed with the present invention without departing from the scope and spirit of the present invention.

Attachment plate 141' further comprises a T-shaped base member 154' defining a hole 156' therein and adapted for interconnecting the attachment plate 141' with the cross member 110 of the bike frame 102 for further attaching and stabilizing the system 116' on the bike frame. This may be easily accomplished with a standard nut and bold combination, a hand-operable quick release threaded screw and nut (or as threaded and tightened into the cross member 110 itself).

Figure 12:
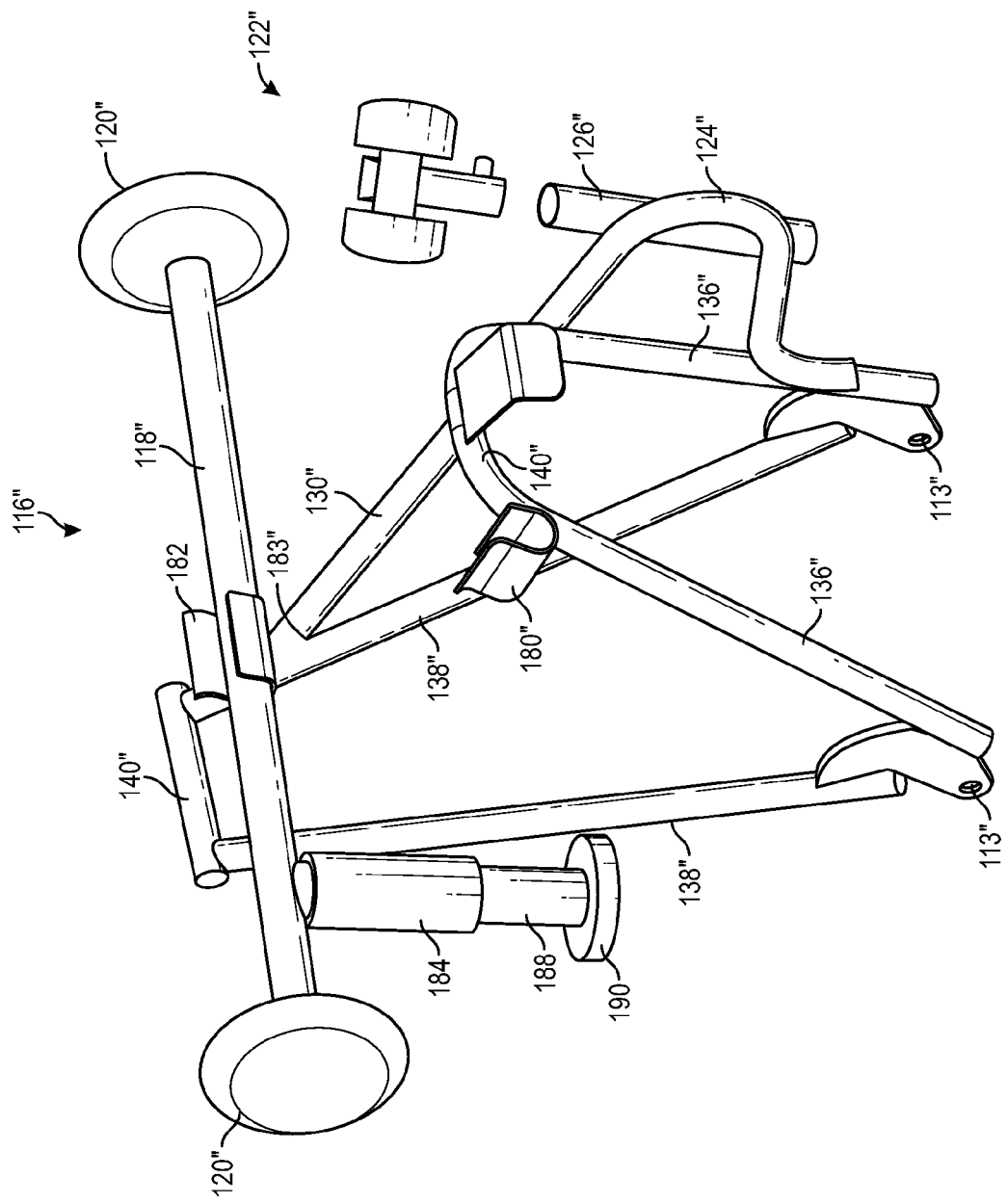
FIG. 12 is a rear perspective view of an alternate embodiment of a multi-mode system for rolling a folded bike, but detached from a bike frame, and with a pivotable wheel axle, adapted for use for both luggage cart type and shopping cart type auxiliary transport modes.

In an embodiment, there is also provided a lateral attachment plate 158' on lateral frame member 130'. Similar to attachment plate 141', attachment plate 158' comprises, in an embodiment, a plurality of dispersed alignment holes or slots 160'. And similar to attachment plate 141', attachment plate 158' is adapted to receive the elongated axle 118' further comprising a corresponding attachment plate 142' welded thereon, with protruding guide and alignment pins 147' also corresponding with each guide or alignment hole or slot 160', as well as the spring-loaded, quarter-turn quick-release hardware system attachment member 146' of the elongated axle 118'. Holes 168' are for reducing weight of the attachment plates 141' and 158'. It will be appreciated that there are other ways known to releasably attach the axle 118' to the frame, such as with clips as shown in FIG. 12, or with straps, or other equivalent means of releasably retaining.

Thus, further, preferably in connection with an embodiment of the invention, attachment plate 158' also comprises a central hole 162', which together with female attachment hardware installed therein comprises an attachment receptacle 164', adapted for retaining the keyed attachment member 146' mounted in corresponding attachment plate 142' of axle 118'. Thus, upon turning the male protruding pin 150' of the keyed attachment member 146' a quarter of a turn, the key on the axle 118' engages and locks the axle into position, together with the retaining guides or pins 147' retained in dispersed guide holes 160'. Detachment of the axle 118' is accomplished with this same process but performed in reverse to disengage the keyed attachment member 146' from the attachment receptacle 164' to allow repositioning of the axle to another location, for example back to attachment plate 141' with attachment receptacle 149' described previously.

As can be seen most easily in FIGS. 3 and 9, there is provided a notch 191 adapted for supporting the axle 118' in a lateral luggage cart mode type of operation for when greater loads are imposed on the axle to lend greater strength and stability to the system and to prevent the axle or frame plate 158' from being unduly stressed at its point of attachment to frame plate 158'.

Pivoting Alternative Embodiment

Referring specifically to FIG. 12, there is provided an alternative embodiment of a multi-mode auxiliary wheel system 116" that is similar to the system 116' described previously, in that it does not include a rack 134, but which is different from system 116' in that there is provided a pivotable axle 118" that is repositionable in at least two different positions, one laterally positioned for luggage cart type mode operation on auxiliary wheels 120" on each end of axle 118", and one transversely positioned for shopping cart type mode operation together with an omnidirectional wheel 122, 122'.

Like the multi-mode auxiliary wheel system 116', the system 116" comprises an upper lateral frame member 130" interconnected with stabilizing transverse cross frame members 140". As will be appreciated, the term "upper" is used herein to denote the fact that the upper lateral frame member 130" is above a horizontal bisecting line of the rear wheel 104 when the bike 100 is in an upright, non-folded, and ridable condition, since when the bike (generally of the type shown in FIGS. 1 and 2) is in a folded condition, the upper lateral frame member 130" would be below the horizontal bisecting line such that the system may be adapted to support the bike 100 for auxiliary mode transport on the ground as further described below.

The multi-mode auxiliary wheel system 116" may further comprise a plurality of aft supporting side frame members 136", a plurality of forward supporting side frame members 138", and a plurality of transverse frame members 140". The plurality of supporting side frame members 136", 138", and the plurality of transverse frame members 140", are adapted for positioning adjacent an upper portion of each side of the rear wheel 104 of the bike 100, such that the supporting side frame members form an angular V-shaped and wedge-shaped framework wherein an upper portion of each side frame member 136", 138" on either side of the rear wheel is interconnected via a transverse frame member 140". Further, each supporting side frame member 136", 138" essentially interconnects the lateral frame member 130" and transverse frame members 140" to rear wheel 104 riding axle 112, and hence to rear wheel supporting struts 108 of the foldable bike frame 102. This interconnection is accomplished via a plurality of eyelet, or quick-release slots, 113", at a position near a converging point of the wheel supporting struts 108 where the wheel supporting struts and the supporting side frame members 136", 138" interconnect the frame 102 of the bike 100, and the multi-mode auxiliary wheel system 116" (via eyelets 113"), respectively, adjacent the axle 112 of the rear wheel 104 in a manner understood by those skilled in the art of attachment of bike racks and bike frames generally.

During riding mode of the bike 100, the upper lateral support frame member 130" and the transverse frame members 140" are generally oriented horizontal with the ground and are positioned above wheel 104. However, during auxiliary wheeling mode, this same upper lateral support frame member 130" and transverse frame members 140" are flipped upside down through the action of pivoting of the bike 100 (of the type shown in FIGS. 1 and 2) during folding thereof, so as to be positioned generally oriented horizontal and between the rear wheel 104 and the ground, or in the case of the upper lateral support frame member 130" sufficiently below the midline of the wheel (i.e., below riding axle 112) to allow appropriate luggage cart auxiliary wheeling. Thus, in the case of the reduced frame alternate pivotable embodiment of the multi-mode auxiliary wheel system 116", the transverse frame members and side frame members 136", 138" are positioned in an inverted generally U-shaped configuration during riding mode of the bike 100, whereas during auxiliary wheeling modes these are positioned in a generally U-shaped position with the bottom portion of the "U" positioned between the wheel 104 and the ground in order to support the bike 100 on, and allow auxiliary movement of the bike with, auxiliary wheels 120" and 122".

Thus, in either condition, whether during riding mode or during either type of auxiliary wheeling mode, the aforementioned elongated axle 118', smaller auxiliary wheels 120" mounted rotatably at the ends of the elongated axle, and omnidirectional wheel 122", such as a swivel caster wheel, are repositionably (e.g., through pivoting in this embodiment) fixed (e.g., using retaining members, such as clips 180, 182 further described below, in connection with this embodiment) relative to the rear wheel 104 and foldable bike frame 102.

In this embodiment of system 116", the means for releasably attaching the repositionable and pivotable axle 118" in a plurality of positions relative to the bike frame 102, the wheel 104, and the swiveling caster, or omnidirectional, wheel 122, 122', 122", comprises a plurality of retaining members, such as clips 180, 182, each clip positioned at a location on the frame work of the system 116" so as to facilitate a stable base, i.e., in the form of an isosceles triangle with the omnidirectional wheel pivot axle located on a bisecting centerline of the triangle, the bisecting centerline also lying superimposed on the centerline of travel of the system in shopping cart mode. It will be appreciated by those skilled in the art that this system 116" disclosure, which is set forth with preferred embodiments only, simplifies the attachment and detachment, or repositioning, of the axle 118" such that a number of different orientations of auxiliary wheels relative to the bike wheel 104 may be more easily accommodated without departing from the true scope and spirit of the invention as claimed.

In the shopping cart type mode of auxiliary transport, the system 116" facilitates fixing of the wheels 120" and 122" preferably in an isosceles triangle base configuration (if there are only three auxiliary wheels in use) with the use of a pivot retaining tube member 184 fixed on a proximal forward side support frame member 138", which pivot retaining tube member in accordance with this embodiment allows pivoting of the axle 118" on a perpendicularly attached, and generally vertically oriented, pivot axis rod member 188 to a plurality of positions. The pivot axis rod member 188 is retained in the pivot retaining tube member 184 with the use of a retaining cap 190 which the user may use to help disengage the axle 118" from clip 182 after use of the system 116" in a transverse shopping cart mode of auxiliary transport to reposition the axle, pivoting it through an angular transposition about the pivoting axis of the pivot axis rod member 188 within the retaining tube member 184, to a lateral and luggage cart type mode transport. Likewise, retaining cap 190 may be used to disengage the axle 118" from clip 180 after use of the system 116" in a lateral luggage cart mode of auxiliary transport to reposition the axle, again pivoting it through an angular transposition about the pivoting axis of the pivot axis rod member 188 within the retaining tube member 184, back to a transverse shopping cart mode of auxiliary transport, all in accordance with one or more aspects of the invention.

In the luggage cart type mode of auxiliary transport, the auxiliary wheels 120" mounted at the ends of axle 118" are preferably positioned laterally relative to the rear wheel 104. Thus, it will be appreciated that upper lateral frame member 130" is generally adjacent an upper portion of the wheel 104 in a riding mode such that upon flipping of the wheel 104 during folding of the bike, the frame member 130" preferably will be below the midline of the wheel (i.e., below the level of the wheel axle 112). Further, in the luggage cart type mode, the swivel caster wheel 122" may preferably remain in a retracted position above a ground plane, or alternatively may simply be used as a means for supporting the folded bike 100 upright while the user stands still and is not engaged in auxiliary movement of the folded bike.

As with previous embodiments, there is also provided a frame member support structure 124" and retaining tube 126" within which the omnidirectional wheel 122" may be pivotably connected to the bike rear frame preferably via the system 116" framework, that is via upper lateral frame member 130" and side supporting frame members 136", 138". The omnidirectional wheel 122" may thus be permanently attached to the bike 100 via the support structure 124" and retaining tube 126", or alternatively as shown in FIG. 10, and preferably, there is provided a removable/retractable omnidirectional wheel 122" which may be implemented with any embodiment of the invention via a frame member support structure and retaining tube as further described above.

Preferably, the V-shaped, wedge-shaped frame comprised of side frame members 136", 138", and transverse frame members 140" is generally rectangular in shape from a top view so as to have a forward end and an aft end and so as to appear to ride above and envelope the rear wheel in top view thereof. At either end of this generally rectangular framework, as viewed in a top view, but at least preferably at the forward end of the frame work, there may be provided a transverse frame member and attachment plate as described above in connection with the same member 141, 141' above, but note that in the present embodiment of system 116", there is no need for attachment receptacle hardware, since the pivotable axle system presented and further described below obviates the need for such attachment hardware. Further, in this embodiment 116" (like the other embodiments) of a multi-mode auxiliary wheel system and bike combination, the attachment plate, or transverse or other frame members of the invention (or other frame members), may be part of the frame of the bike 100 itself (e.g., forward cross member 140" may actually be cross member 110 of the bike 100), with other frame members of the system depending from bike frame members in such a case. Still further, it will be appreciated that attachment plate 141 hardware 146', 147' need not be included with this embodiment of the invention, as it will be appreciated that such is obviated by a more simple engagement mechanism, or retaining mechanism, illustrated by way of example herein as attachment clip 182. In this embodiment of the invention, attachment clip 182 is preferably positioned adjacent a converging point 183 of upper lateral frame member 130" and the forward lateral side frame member 138" that is laterally spaced away from the retaining pivot tube 184 mounted on the side frame member 138" located proximal to the retaining pivot tube 184.

Accordingly, the elongated axle 118" of this embodiment of system 116" also does not require a corresponding attachment plate 142' welded thereon, nor protruding guide and alignment pins 147' and related features, since such are not required for this embodiment of the invention.

Still further, in accordance with this embodiment of the invention, there is not needed a lateral attachment plate 158' on a lateral frame member 130', since a more simple retaining member, such as the clip 180, would serve substantially the same purpose. Thus, it will be appreciated by those skilled in the art that this embodiment of the invention simplifies not only the process of operating the invention, but also simplifies the hardware necessary to implement the invention. And this shall serve to underscore the scope of the invention as broadly claimed, to include any configuration of frame members comprising a repositionable axle with auxiliary wheels thereon and used together with at least one omnidirectional wheel (in a three-wheel embodiment), or a plurality of omnidirectional wheels (in a four-wheeled embodiment), as long as there is an axle repositionable relative to the bike frame, wheel, and or omnidirectional wheel(s), as set forth and claimed herein.

Principles of Operation for Enhanced Stability

Referring now to FIGS. 6-8, there are shown schematic diagrams of a plurality of embodiments of the invention. Note that the base number of each element described is listed only, and not its various primes, since it will be apparent to those skilled in the art that the diagram is for illustration purposes, and it will be further appreciated by those skilled in the art the degree to which the principles described in connection with this Figure apply equally to all embodiments of the invention described herein. Where there are differences, such as in the case of an alternative embodiment for an extensible axle shown in FIGS. 7 and 8, these figures are designated with a single reference number to designate that new embodiment, but the general principles described therewith are likewise not limited only to that embodiment described herein.

Thus, there are shown various embodiments of axle 118 in various positions of placement relative to the multi-mode auxiliary wheel system 116 (including all embodiments of the system 116 herein), and hence the omnidirectional wheel 122, as well as relative to the bike centerline and bike wheel centerline of travel (designated CLB), in order to better illustrate the principles of operation of the system for enhanced stability.

According to the invention, an omnidirectional wheel is mounted on frame members with its axis of pivoting offset from the center line of the bike and its wheels' centerline of travel (designated CLB) and the frame members (also designated CLB) in such a way during the operation of shopping mode the swivel axis is on the center line of the traveled axle (FIGS. 6B and 8), wherein the centerline of travel of the axle is designated as CLT (in FIGS. 6A-8). And it is on this CLT on which the swivel wheel axis of rotation is advantageously positioned. This is necessary so that the single omnidirectional, or swivel, wheel would tend not to veer to the left or right when the cart is pushed, and this in turn greatly lends to the improved stability and steerability of the system as described and claimed.

The systems as shown in FIGS. 6A and 7, have the swivel wheel position toward the end of the rack or system framework and the axle wheels positioned toward the front of the rack or system framework. It is possible to have a design with wheels in reverse order, i.e. with the swivel wheel located near the front of the system. Placement, in this regard, of the swivel wheel, may depend on aesthetics, where the swivel wheel may be more hidden near the front of the system framework. Thus, the aesthetic aspects of the invention must be weighed relative to stability, steerability, etc., of the system. In all FIGS. 6A-8, the swivel wheel is shown at its most likely preferable location for the greatest number of bike types, at the rear of the system framework for purposes of stability. Of course, the system of FIG. 6A is shown in a luggage cart mode configuration.

FIGS. 7 and 8 show a diagram of a variation of system of the present invention. In this system, the axle 118''' is extensible, however, more importantly, the axle 118''' of this variation is in harmony with broader aspects of the invention since it also as presently claimed comprises the axle itself able to be repositioned, whether laterally or transversely, whether by pivoting through angular lateral displacement type of rotation as shown and described with system 116" in FIG. 12, or as by attachment and detachment displacement of the axle itself for transpositioning as shown with systems 116 and 116'. Thus, this variation of the system is also able to engage in luggage cart type mode and shopping cart type mode in optimum configurations with a swivel wheel preferably mounted near the rear of the system framework. As explained earlier, the swivel wheel axis for this embodiment, is also offset from the CLB so that it would be on the CLT of the traveled axle when the axle is fully extended.

Bike and Multimode Auxiliary Wheel System Combined

It will be appreciated that the invention may be embodied in a system apart from a bike 100, as described above, or in combination with a bike 100, without departing from the scope and spirit of the invention as claimed. In such a combination, it will be appreciated that various frame and supporting members of the invention, such as perhaps forward side supporting member 138, or transverse member 141, may to varying degrees be served by components of the bike itself, such as lateral strut members 108, cross support member 110, or perhaps even the bike fender 166 if such is made sturdy enough, all without departing from the scope and spirit of the invention as claimed. In such case, it will be appreciated that where a frame member of the bike may provide the functional equivalent of a frame member of the system 116 as described, this may be done without departing from the true scope and spirit of the invention as claimed.

While preferred embodiments of the present invention have been shown and described, it will be apparent to those skilled in the art that many changes and modifications may be made without departing from the invention in its broader aspects. For example, it will be appreciated that one of ordinary skill in the art may mix and match the various components of the various embodiments of the invention disclosed herein without departing from the true spirit of the invention as claimed. Thus, it will be appreciated that different structures, aspects and objects disclosed herein may be mixed and matched on different embodiments disclosed without departing from the scope and spirit of the claimed invention. Thus, for example, it will be appreciated that different systems of attachment and detachment type hardware may be employed on different embodiments of the invention, whether with a rack, or without a rack, whether adapted for the type of bike shown in the Figures or a different type of bike, or whether different modes of repositioning an axle to arrive at shopping cart mode or luggage cart mode types of auxiliary wheeling are employed, such mixing and matching on different embodiments disclosed are nevertheless intended to fall within the scope of the invention as claimed. The appended claims are therefore intended to cover all such changes and modifications as fall within the true spirit and scope of the invention.

What is claimed is:

1. A multi-mode auxiliary wheel system, adapted for attachment to a bike having a foldable frame and having lateral wheel supporting struts supporting a rear wheel on the foldable frame, for auxiliary rolling of the bike in a folded bike condition, comprising:
at least one lateral frame member;
at least one transverse frame member adapted for attachment to the foldable frame;
at least one supporting side frame member interconnecting said at least one lateral frame member and said at least one transverse frame member, said at least one supporting side frame member adapted for attachment to one of the rear wheel supporting struts of the foldable frame so that said lateral frame member and said transverse frame member are positioned adjacent the rear wheel in an unfolded, ridable, orientation of the bike;
a detachable elongated axle member adapted for attachment to and quick detachment from each said at least one lateral frame member and said at least one transverse frame member;
a plurality of auxiliary wheels rotatably mounted on said detachable elongated axle member; and
at least one swivel caster auxiliary wheel attached to said at least one lateral frame member, wherein in a first position of attachment of said detachable elongated axle member on said at least one lateral frame member the multi-mode auxiliary wheel system is adapted for enabling luggage cart auxiliary rolling of the folded bike during which said at least one swivel caster auxiliary wheel need not touch the ground upon a user's tipping of the folded bike for auxiliary rolling on said plurality of auxiliary wheels rotatably mounted on said detachable elongated axle member, and wherein in a second position of attachment of said detachable elongated axle member on said at least one transverse frame member the multi-mode auxiliary wheel system is adapted for shopping cart rolling of the folded bike during which each of said plurality of rotatable auxiliary wheels mounted on said detachable elongated axle member and said at least one swivel caster auxiliary wheel are all enabled to touch the ground.

2. The multi-mode auxiliary wheel system of claim 1, wherein said at least one lateral frame member comprises a plurality of upper lateral frame members, one of said plurality of upper lateral frame members being adapted for positioning adjacent an upper portion of each side of the rear wheel of the bike, wherein said at least one transverse frame members comprises a plurality of transverse frame members, and wherein said at least one supporting side frame member comprises a plurality of supporting side frame members, each said supporting side frame member interconnecting a lateral frame member to a transverse frame member, and each supporting side frame member attaching a lateral frame member and a transverse frame member to a wheel supporting strut of the foldable frame so that said lateral frame members and said transverse frame members are positioned adjacent an upper portion of the rear wheel in an unfolded, ridable, orientation of the bike.

3. The multi-mode auxiliary wheel system of claim 2, wherein said plurality of lateral frame members are substantially horizontal, wherein one of said plurality of transverse frame members is substantially horizontal, wherein another of said plurality of transverse frame members comprises an inverted U-shaped frame member, wherein each of said plurality of supporting side frame members forms an angular V-shaped frame member, each angular V-shaped frame member being interconnected by the transverse frame members adjacent an uppermost portion of each V-shaped frame member so as to interconnect the plurality of V-shaped frame members, wherein each of said plurality of lateral frame members spans and interconnects each uppermost angular portion of each V-shaped member so as to create a generally triangular and wedge-shaped overall frame structure for the multi-mode auxiliary wheel system, wherein a lowermost portion of each V-shaped frame member is adapted for interconnection of the overall frame structure with the foldable frame at a point where the wheel supporting struts of the foldable frame attach to a rear axle for the rear wheel, further comprising an extension frame member extending from one of said plurality of lateral frame members adapted for retaining said at least one caster wheel said extension frame member being located at a position remote from the first position of attachment and remote from the second position of attachment so as to create a stable auxiliary wheel rolling base for shopping cart auxiliary rolling of the folded bike.

4. The multi-mode auxiliary wheel system of claim 3, further comprising an offset attachment bracket on said detachable elongated axle member, said offset attachment bracket positioned more closely adjacent one rotatable axle wheel on said detachable elongated axle member such that upon attachment of said detachable elongated axle member on the substantially horizontal one of said plurality of transverse frame members, said rotatable wheels and said at least one caster wheel are configured in the form of an isosceles triangle with the center of rotation of said at least one caster wheel being positioned on a bisecting centerline of the triangle for stability during shopping cart rolling.

5. The multi-mode auxiliary wheel system of claim 1, wherein said detachable elongated axle member is extendable such that said rotatable auxiliary wheels on said detachable auxiliary axle member are further apart during an extended orientation and adapted for stability for auxiliary wheeling of the bike in a folded orientation.

6. The multi-mode auxiliary wheel system of claim 1, further comprising a plurality of attachment receptacles, at least one attachment receptacle for said at least one lateral frame member and at least one attachment receptacle for said at least one transverse frame member, further comprising quick-release fastening hardware, and wherein said plurality of attachment receptacles are adapted for receipt and release of said fastening hardware for quick attachment of, and quick detachment of, said detachable elongated axle member to and from said plurality of attachment receptacles.

7. A multi-mode auxiliary wheel system adapted for rolling a folded bike of a type having a rear wheel with wheel supporting struts, the rear wheel and supporting struts combination being foldable about a bike frame articulation joint to a folded position where the rear wheel and supporting struts are positioned upside down while in a folded non-ridable configuration of the bike, comprising:
an upper auxiliary wheel system rack frame member;
at least one supporting side frame member attached to said upper auxiliary wheel system rack frame member and adapted for attachment to the rear wheel supporting struts of the foldable bike so that said upper auxiliary wheel system rack frame member is positioned adjacent an upper portion of the rear wheel during an unfolded, ridable, orientation of the bike;
a first attachment receptacle on said upper auxiliary wheel system rack frame member;
a second attachment receptacle on said upper auxiliary wheel system rack frame member;
a detachable elongated axle member adapted for attachment to said first receptacle and alternatively to said second attachment receptacle on said upper auxiliary wheel system rack frame member;
a plurality of auxiliary wheels rotatably mounted on said detachable elongated axle member; and
at least one swivel caster auxiliary wheel attached to said upper auxiliary wheel system frame member, wherein in a first position of attachment of said detachable elongated axle member on said upper auxiliary wheel system rack frame member the multi-mode auxiliary wheel system is adapted for enabling luggage cart auxiliary rolling of the folded bike during which said at least one swivel caster auxiliary wheel need not touch the ground upon a user's tipping of the folded bike for auxiliary rolling on said plurality of auxiliary wheels rotatably mounted on said detachable elongated axle member, wherein in a second position of attachment of said detachable elongated axle member on said upper auxiliary wheel system frame member the multi-mode auxiliary wheel system is adapted for shopping cart rolling of the folded bike during which each of said plurality of rotatable auxiliary wheels mounted on said detachable elongated axle member and said at least one swivel caster auxiliary wheel are all enabled to touch the ground, and wherein said upper auxiliary wheel system rack frame member is adapted for attachment to the bike such that during a ridable non-folded condition of the bike said upper auxiliary wheel system rack frame member serves an additional purpose of providing a flat surface for a user to support and secure items such as books and groceries while riding the bike.

8. The multi-mode auxiliary wheel system of claim 7, wherein said upper auxiliary wheel system frame member is substantially rectangular.

9. The multi-mode auxiliary wheel system of claim 8, wherein said detachable elongated axle member is extendable such that said rotatable auxiliary wheels on said detachable auxiliary axle member are further apart during an extended orientation and adapted for stability for auxiliary wheeling of the bike in a folded orientation.

10. The multi-mode auxiliary wheel system of claim 7, further comprising an offset attachment bracket on said detachable elongated axle member, said offset attachment bracket positioned more closely adjacent one rotatable axle wheel on said detachable elongated axle member such that upon attachment of said detachable elongated axle member in the second position of attachment, said rotatable wheels and said at least one caster wheel are configured in the form of an isosceles triangle with the center of rotation of said at least one caster wheel being positioned on a bisecting centerline of the triangle for improved stability during shopping cart type rolling.

11. The multi-mode auxiliary wheel system of claim 7, further comprising quick-release fastening hardware, and wherein said first attachment receptacle and said second attachment receptacle are adapted for receipt and release of said fastening hardware for quick attachment of, and quick detachment of, said detachable elongated axle member to and from said upper auxiliary wheel system frame member.

12. The multi-mode auxiliary wheel system of claim 7, wherein said at least one supporting side frame member comprises a plurality of supporting side frame members, each of said plurality of supporting side frame members having first and second ends, wherein said first end of each said supporting side frame member is attached to said upper auxiliary wheel system frame member, wherein said second end of each said supporting side frame member is adapted for attachment to a corresponding supporting strut of the foldable bike so that said upper auxiliary wheel system frame member is positioned adjacent an upper portion of the rear wheel during an unfolded, ridable, orientation of the bike.

13. The multi-mode auxiliary wheel system of claim 7, wherein the multi-mode auxiliary wheel system is adapted for luggage cart transport and wheeling of the folded bike when said detachable elongated axle member is attached to said upper auxiliary wheel system frame member via said first attachment receptacle, and wherein the multi-mode auxiliary wheel system is adapted for shopping cart transport and wheeling of the folded bike when said detachable elongated axle member is attached to said upper auxiliary wheel system frame member via said second attachment receptacle.

14. The multi-mode auxiliary wheel system of claim 7, wherein said at least one swivel caster wheel further comprises an extensible caster axle adjustable between first and second positions, wherein said at least one swivel caster wheel is user-positionable retractable on said extensible caster axle.

15. A multi-mode auxiliary wheel system and foldable bike combination adapted for rolling the foldable bike when in a folded condition, comprising:
a bike having a foldable frame supporting a rear wheel and a front wheel, the rear wheel supported by a riding wheel axle and a plurality of supporting lateral struts of the foldable frame, the foldable frame further comprising a transverse interconnecting member interconnecting the plurality of lateral struts, the rear wheel, supporting lateral struts and transverse interconnecting member combination being pivotable together about a rear bike frame articulation joint to a folded position wherein the rear wheel, supporting lateral struts, and transverse interconnecting member are positioned upside down while the bike is in a folded non-ridable configuration;
an upper auxiliary wheel system frame member attached to the foldable frame of said bike;
at least one supporting side frame member having first and second ends, the first end attached to said upper auxiliary wheel system frame member and the second end attached to one of said supporting lateral struts of the foldable bike so that said upper auxiliary wheel system frame member is positioned adjacent an upper portion of the rear wheel during an unfolded, ridable, orientation of the bike;

at least one attachment receptacle on at least one of the transverse interconnecting member and said upper auxiliary wheel system frame member;

an elongated axle member adapted for attachment to said at least one attachment receptacle and adapted for repositioning to a plurality of different positions relative to the foldable frame of said bike;

a plurality of auxiliary wheels rotatably mounted on said elongated axle member and adapted for displacement to a plurality of positions relative to the attachment of said elongated axle member at said at least one attachment receptacle; and at least one swivel caster auxiliary wheel mounted on said upper auxiliary wheel system frame member, wherein in a position of displacement of said auxiliary wheels mounted on said elongated axle member on said upper auxiliary wheel system frame member the multi-mode auxiliary wheel system is adapted for shopping cart auxiliary wheeling of the folded bike during which each of said plurality of rotatable auxiliary wheels mounted on said elongated axle member and said at least one swivel caster auxiliary wheel all would touch the ground.

16. The multi-mode auxiliary wheel system of claim 15, further comprising another attachment receptacle, wherein said at least one attachment receptacle is on the transverse interconnecting member and said another attachment receptacle is on said upper auxiliary wheel system frame member, wherein said elongated axle member is repeatedly detachable and re-attachable such that said elongated axle member is adapted for temporary attachment to said another attachment receptacle on said upper auxiliary wheel frame member for luggage cart auxiliary wheeling operation, and alternatively on said at least one attachment receptacle on the transverse interconnecting member for shopping cart operation together with said swiveling caster auxiliary wheel.

17. The multi-mode auxiliary wheel system of claim 16, wherein said elongated axle member is extendable such that said rotatable auxiliary wheels on said detachable auxiliary axle member are further apart during an extended orientation and adapted for greater stability for auxiliary wheeling of the bike in a folded orientation.

18. The multi-mode auxiliary wheel system of claim 16, further comprising quick-release fastening hardware, and wherein said another attachment receptacle and said at least one attachment receptacle are adapted for receipt and release of said fastening hardware for quick attachment of, and quick detachment of, said detachable elongated axle member to and from said another attachment receptacle and said at least one attachment receptacle.

19. A multi-mode auxiliary wheel system, adaptable for attachment to a rearward portion of a foldable bicycle, comprising:
 a. a frame member;
 b. an elongated axle of a length longer than the foldable bicycle width;
 c. auxiliary wheels mounted rotatably on said axle;
 d. a support structure fixedly connected to said frame member;
 e. an omnidirectional auxiliary wheel fixed to said frame member and positioned laterally with respect to the bicycle rear wheel, wherein the axle is moveably connected to said frame member and moveable into two different positions with respect to said omnidirectional wheel, wherein when said elongated axle is in a transverse position, said auxiliary wheels and said omnidirectional wheel are configured in the form of an isosceles triangle with said omnidirectional wheel positioned on a center line, and such that when the rear bicycle wheel is flipped upside down the auxiliary wheels and said omnidirectional wheel touch the ground to support the folded bike in a shopping cart mode configuration, and wherein when said elongated axle is in a lateral position said elongated axle is positioned roughly 90 degrees from the transverse position to be in a slip stream of the bicycle in a ridable configuration such that said elongated axle and said auxiliary wheels won't interfere with pedaling which would cause a dangerous condition when riding were an otherwise long axle to protrude out of the slip stream.

20. The multi-mode auxiliary wheel system of claim 19, wherein said elongated axle is repositionable to the transverse and the lateral positions by pivoting motion, and wherein said elongated axle is fixable at each the transverse and the lateral positions by a retaining member.

* * * * *